United States Patent
Suzuki et al.

(10) Patent No.: US 7,603,230 B2
(45) Date of Patent: Oct. 13, 2009

(54) ROUTE GUIDANCE SYSTEM, MOBILE TERMINAL, SERVER, PROGRAM AND RECORDING MEDIUM

(75) Inventors: Yusuke Suzuki, Tokyo (JP); Shin Kikuchi, Tokyo (JP); Keisuke Onishi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 282 days.

(21) Appl. No.: 10/577,803

(22) PCT Filed: Oct. 27, 2004

(86) PCT No.: PCT/JP2004/015886

§ 371 (c)(1),
(2), (4) Date: Dec. 22, 2006

(87) PCT Pub. No.: WO2005/040724

PCT Pub. Date: May 6, 2005

(65) Prior Publication Data

US 2007/0083324 A1    Apr. 12, 2007

(30) Foreign Application Priority Data

Oct. 29, 2003    (JP) .............................. 2003-369314

(51) Int. Cl.
*G01C 21/00* (2006.01)
*G08G 1/0968* (2006.01)
(52) U.S. Cl. .................... 701/209; 701/24; 701/201; 701/206; 701/211; 340/995.12; 340/995.2
(58) Field of Classification Search .................. 701/24, 701/209

See application file for complete search history.

(56) References Cited

U.S. PATENT DOCUMENTS 6,292,743 B1 *   9/2001   Pu et al. ...................... 701/202

(Continued)

FOREIGN PATENT DOCUMENTS

CN            1321874 A         11/2001

(Continued)

OTHER PUBLICATIONS

International Search Report mailed Feb. 15, 2005 of International Application PCT/JP2004/015886.

(Continued)

*Primary Examiner*—Thomas G Black
*Assistant Examiner*—Lin B Olsen
(74) *Attorney, Agent, or Firm*—Westerman, Hattori, Daniels & Adrian, LLP.

(57) ABSTRACT

Guide points can be grasped by use of a mobile terminal. The mobile terminal comprises search condition transmitting means (KC16A) for transmitting data of route searching conditions to a server; searching result receiving means (KC1A) for receiving, from the server, route data produced by the server in accordance with the route searching conditions; map request information transmitting means (KC16B) for transmitting, to the server, map data transmission request information for requesting a transmission of map data; map data receiving means (KC1B) for receiving the map data transmitted from the server; route image producing means (KC7) for producing a route image based on a range in which to display on the information display screen (11) and based on the route data; and guide map image producing means (KC8) for producing a route guidance map image by combining, based on the map data, a map image and the route image.

3 Claims, 14 Drawing Sheets

U.S. PATENT DOCUMENTS

| | | | |
|---|---|---|---|
| 6,725,155 B1 | 4/2004 | Takahashi et al. | |
| 7,308,359 B1 * | 12/2007 | Krull et al. | 701/211 |
| 2001/0001847 A1 * | 5/2001 | Hessing | 701/209 |
| 2001/0037305 A1 | 11/2001 | Mochizuki | |
| 2002/0128768 A1 | 9/2002 | Nakano et al. | |
| 2004/0044470 A1 * | 3/2004 | Matsuoka et al. | 701/209 |
| 2005/0055155 A1 * | 3/2005 | Mafune | 701/202 |

FOREIGN PATENT DOCUMENTS

| | | |
|---|---|---|
| JP | 10-502174 | 2/1998 |
| JP | 10-319840 | 12/1998 |
| JP | 2002-048579 A | 2/2002 |
| JP | 2002-340594 | 11/2002 |
| JP | 2003-214860 A | 7/2003 |
| JP | 2003-269978 A | 9/2003 |
| WO | WO 96/00373 | 1/1996 |
| WO | WO00/47951 | 8/2000 |

OTHER PUBLICATIONS

Japanese Office Action dated Dec. 10, 2007, issued in corresponding Japanese Patent Application No. 2003-369314.

* cited by examiner

Start Location
- ⊙ G P S
- ○ Telephone Number [ ]
- ○ Address [ ]

} START LOCATION ENTRY FIELD

Destination
[Tokyo Tower]

] DESTINATION ENTRY FIELD

Date and Time
[ ] / [ ] / [ ]
[ ] : [ ]

⊙ Departure  ○ Arrival

} ENTRY FIELD OF DATE AND TIME OF DEPARTURE OF ARRIVAL

Number of Searched Routes
⊙ 1  ○ 2  ○ 3

] ENTRY FIELD OF NUMBER OF SEARCHED ROUTES

Transportation
- ⊙ Transportation Facilities + Walk
- ○ Walk
- ○ Car

} TRANSPORTATION MEANS ENTRY FIELD

[Start Search]

FIG. 3

ROUTE GUIDANCE SYSTEM, MOBILE TERMINAL, SERVER, PROGRAM AND RECORDING MEDIUM

BACKGROUND OF THE INVENTION

1. Field of the Invention

The present invention relates to a mobile terminal provided with an information display screen which can display a route image showing a route from a starting location to a destination location specified by a user, a server which can transmit/receive data to/from the mobile terminal, and can produce a route according to the user's specification, a route guidance system which is provided with the mobile terminal and the server, programs which are used by the mobile terminal and the server, and a recording medium which records the programs.

The present invention more particularly relates to a mobile terminal such as a mobile phone and a PDA (Personal Digital Assistant) which can provide the user with a guidance route based on the user's current location and route data, a server which can transmit/receive data to/from the mobile terminal, a route guidance system which is provided with the mobile terminal and the server, programs which are used by the mobile terminal and the server, and a recording medium which records the programs.

2. Description of Prior Art

Recently, mobile terminals such as mobile phones have become more functional, as they are now equipped with navigation technology which guides/leads a user to a destination location by delivering to the mobile terminal a map image including a route to the destination location, showing the map image on the information display screen of the mobile terminal, and showing the current location on the map image by measuring the current location by means of the GPS (Global Positioning System). In Japanese Laid-Open Patent Publication No. 2003-214860 (paragraphs [0037], [0050] to [0055], FIGS. 4 to 6, 16, and 17, hereafter "Patent Document 1"), such navigation technology has been disclosed, in which a route is searched based on searching conditions such as a destination location transmitted from a mobile terminal, and data such as searching results is delivered to the mobile terminal to guide the user to the destination location.

In Patent Document 1, a server is made to search for an optimal route, treat the route as a road and assign it with a specific color, produce map data by building a route image (the road image with specified color) and incorporating it into a map image, and transmit the map data to the mobile terminal. Moreover, according to the technology described in Patent Document 1, the map image is constituted by multiple unit maps of a predetermined scale, whereas the route is built into the respective unit-maps, and data of the unit maps which includes the route, and the map image can be displayed on the screen of the mobile terminal based on the user's current location.

According to Patent Document 1, to determine a route, a user observes a map image, a route image, and an image of his-current location shown on the screen. For example, if the route is set to turn at an intersection, the user has to determine in which direction to turn, and may take a wrong direction. Moreover, when the user walks along a route while constantly looking at the screen of the mobile terminal, the user may hit other pedestrians or encounter other obstacles. Thus, because the user cannot always check the screen of the mobile terminal, he will likely miss an appropriate turn.

It is believed that the above problems can be solved by providing for a way of notifying the user when the location to make a turn has been reached or the direction in which to turn (such as "left" or "right") by means of a voice or a displayed image, or a way of notifying the user of the distance to a location for making a turn.

However, according to the technology of prior art such as that described in Patent Document 1, the map data delivered from the server to the mobile terminal already incorporates the route data, and this is intended to reduce the amount of data to be transmitted and received. Accordingly, since the mobile terminal itself does not have the route data, the mobile terminal cannot determine the required notifying location (guide point), and is therefore incapable of providing such information.

In particular, when route data is built into multiple unit maps as described in Patent Document 1, if a location for making a turn exists on a unit map which has not been received, it is not possible to know such location for making a turn and the direction thereof until the unit map including such information is received. It is thus not possible to notify the user of the distance to such location for making a turn, or the direction of the turn to be made.

However, although a map need not be divided into unit maps, and entire map data incorporating a certain route may be transmitted to a mobile terminal which is capable of carrying out route searching, the mobile terminal must be equipped with a storage (memory) device with a large capacity for storing essential data such as map data and time tables of transportation facilities, which would entail additional cost in the production of the mobile terminal.

Further, when a mobile terminal processes route searching, load on the information processing device increases.

SUMMARY OF THE INVENTION

The present invention has therefore been conceptualized to address the foregoing problems. Thus, the objects of the present invention are, namely: (1) to enable a mobile terminal to recognize guide points; (2) to enable the mobile terminal to notify the user of the distance to a guide point, a direction in which to turn, and the like; and (3) to regulate the amount of data conveyed between the mobile terminal and a server when map data for navigation and the like are transmitted and/or received.

In describing the present invention for accomplishing the aforementioned objects, elements of the present invention are referred to by means of numerals assigned to corresponding elements of a specific example (embodiment) enclosed in parenthesis to facilitate understanding of the invention, and are not intended to limit the scope thereof to the embodiment.

FIRST EMBODIMENT

In the first embodiment of the invention, a route guidance system (S) constituting a mobile terminal (1) and a server (7) is provided where:

the mobile terminal (1) comprises the following components (A1) through A(7):

(A1) searching condition input means (KC2) composed of a searching condition entry image display means (KC2A) for displaying an image used to enter a route searching condition consisting of a starting location and a destination location on an information display screen (11) which shows the image, and searching condition storing means (KC2B) which stores the route searching conditions established as a result of the input made to the route searching condition entry image;

(A2) searching condition transmitting means (KC16A) which transmits the route searching condition data to the server (7);

(A3) searching result receiving means (KC1A) which receives route data representing a route from the starting location to the destination location from the server, and which is produced by the server according to the route searching condition data, and (A4) map information request transmitting means (KC16B) which transmits map data transmission requests for the transmission of map data to the server (7);

(A5) map data receiving means (KC1B) which receives map data transmitted from the server (7);

(A6) route image producing means (KC7) which produces a route image based on route data and the possible range of display on the information display screen (11); and (A7) guide map image producing means (KC8) which produces a route guidance map image by combining the route image and the map image obtained based on the map data, and and the server (7) comprises the following components (B1) through (B6):

(B1) searching condition receiving means (SCLA) which receives the route searching condition data transmitted from the mobile terminal (1);

(B2) route producing means (SC3) determines the route (RX) from the starting location (X1) to the destination location (X10) according to the route searching conditions received, and produces the data of the route (RX) including data pertaining to the respective positions of the starting location (X1) and the destination location (X10), and data pertaining to the position of guide points (X5, X8) which are set in the course of the route (RX) for the purpose of notifying the user of guide information.

(B3) route data transmitting means (SC6A) which transmits the route data to the mobile terminal (1);

(B4) map data storing means (SC2) which stores map data;

(B5) map request receiving means (SCLB) which receives the map data transmission request transmitted from the mobile terminal (1); and (B6) map information transmitting means (SC6B) which transmits the map data to the mobile terminal (1) corresponding to the map data transmission request.

Function of the First Embodiment

In the route guidance system (S) of the first embodiment described above, the searching condition entry image display means (KC2A) of the mobile terminal (1) displays an image used to enter route searching conditions consisting of the starting location (X1) and the destination location (X10) on the information display screen (11), and the searching condition storing means (KC2B) stores the route searching conditions established as a result of the input made to the route searching condition entry image. The searching condition transmitting means (KC16A) of the mobile terminal (1) transmits the route searching condition data to the server (7).

The searching condition receiving means (SC1A) of the server (7) receives the route searching condition data transmitted from the mobile terminal (1). The route producing means (SC3) of the server (7) determines the route (RX) from the starting location (X1) to the destination location (X10) according to the route searching conditions received, and produces the route data (RX) consisting of the starting location data which indicates the position of the starting location (X1), the destination location data which indicates the position of the destination location (X10), and the position of the guide points (X5, X8) which are set in the course of the route (RX) to notify the user of guide information. It should be noted that if the determined route (RX) does not include the guide points (X5, X8), the route data produced will not include data pertaining to the position of the guide points (X5, X8), but include destination location data indicating the position of the destination location (X10). The route data transmitting means (SC6A) of the server (7) transmits the route data to the mobile terminal (1). The route data transmitted from the server (7) is then received by the searching result receiving means (KC1A) of the mobile terminal (1).

On the other hand, the map data transmission request which is transmitted by the map information request transmitting means (KC16B) of the mobile terminal (1) for transmission of map data is received by the map request receiving means (SC1B) of the server (7). The map information transmitting means (SC6B) of the server (7) simultaneously transmits the map data transmission request received and the map data which is stored in the map data storing means (SC2), to the mobile terminal (1). The map data transmitted by the server (7) is received by the map data receiving means (KC1B) of the mobile terminal (1). The route image producing means (KC7) of the mobile terminal (1) then produces the route image based on the route data and the possible range of display on the information display screen (11), and the guide map image producing means (KC8) of the mobile terminal (1) produces the route guidance map image by combining the route image and the map image obtained based on the map data.

Under the route guidance system (S) of the first embodiment of the invention, the route guidance image is produced based on map data and route data transmitted as separate data from the server (7) and displayed on the information display screen (11) of the mobile terminal (1). In addition, since the route data includes data pertaining to the position of the guide points (X5, X8), the mobile terminal (1) can recognize the respective positions of the guide points (X5, X8), regardless of the scope of map data received by the mobile terminal (1), and can recognize the guide points (X5, X8) which are not within the scope of the map data received.

Notably, in contrast to the case where a route guidance map image produced upon a combination of all of the route data and the map data is received, the route guidance system (S) of the first embodiment can recognize the guide points (X5, X8) by means of the transmission/reception of route data which is relatively few in quantity, and therefore, the quantity of data to be transmitted or received can be reduced.

First Mode of the First Embodiment

The route guidance system (S) provided in the first mode of the first embodiment of the invention consists of the mobile terminal (1) comprising the following components (A8) through (A11):

(A8) current location measuring means (KC10) which measures the current location of the mobile terminal (1);

(A9) guide execution point setting means (KC11) which sets the guide points (X5, X8) situated along the nearest route (RX) between the current location and the destination location (X10), or the destination location (X10) as the guide execution point;

(A10) distance calculating means (KC12) which calculates the distance (Li) between the current location and the guide execution point based on data pertaining to the position of the current location and the position of the guide execution point; and (A11) guide information notifying means (KC14) which notifies the user of the guide information based on the distance (Li) between the current location and the guide execution point.

Function of the First Mode of the First Embodiment

Under the route guidance system (S) of the first mode of the first embodiment including the above components, the current location measuring means (KC10) of the mobile terminal (1) measures the current location of the mobile terminal (1). The guide execution point setting means (KC11) of the mobile terminal (1) selects from either of the guide points (X5, X8) situated along the route (RX) nearest the current location as the guide execution point or the destination location (X10). The distance calculating means (KC12) of the mobile terminal (1) calculates the distance (Li) between the current location and the guide execution point based on data pertaining to the respective positions of the current location and the guide execution point. Then, the guide information notifying means (KC14) notifies the user of the guide information based on the distance (Li) between the current location and the guide execution point. The route guidance system (S) of the first mode of the first embodiment of the invention can notify the user of relevant guide information such as the distance (Li) to the guide point (X5, X8) representing a corner, and the direction in which to turn at the guide point (X5, X8).

Second Mode of the First Embodiment

The route guidance system (S) provided in the second mode of the first embodiment consists of the mobile terminal (1) comprising the following components (A12) through (A14):

(A12) guide voice storing means (KC14A1) which stores a guide voice for notifying the user that the distance (Li) between the current location and the guide execution point has reached a predetermined distance;

(A13) distance notification discriminating means (KC13) which determines whether the distance (Li) between the current location and the guide execution point has reached a predetermined distance; and (A14) the guide information notifying means (KC14) comprising guide voice reproducing means (KC14A) which reproduces the guide voice as guide information if a predetermined distance has been reached.

Function of the Second Mode of the First Embodiment

Under the route guidance system (S) of the second mode of the first embodiment including the above components, the guide voice storing means (KC14A1) of the mobile terminal (1) stores the guide voice for notifying the user that the distance (Li) between the current location and the guide execution point has reached a predetermined distance. The distance notification discriminating means (KC13) of the mobile terminal (1) determines whether the distance (Li) between the current location and the guide execution point has reached a predetermined distance. If the distance (Li) has reached the predetermined distance, the guide voice reproducing means (KC14A) reproduces the guide voice as the guide information. It is thus possible to notify the user of the distance (Li) to the guide point (X5, X8) by means of the guide voice.

Third Mode of the First Embodiment

In the third mode of the first embodiment, the route guidance system (S) according to the first or second mode of the first embodiment is provided, where the mobile terminal (1) includes:

(A15) the guide information notifying means (KC14) which includes notifying image display means (KC14B) which shows a notifying image (22f) indicating the distance (Li) between the current location and the guide execution point on the information display screen (11) as the guide information.

Function of the Third Mode of the First Embodiment

Under the route guidance system (S) of the third mode of the first embodiment including the above components, the notifying image display means (KC14B) displays the notifying image (22f) indicating the distance (Li) between the current location and the guide execution point as the guide information on the information display screen (11). It is thus possible to notify the user of the distance (Li) to the guide point (X5, X8).

Fourth Mode of the First Embodiment

In the fourth mode of the first embodiment, the route guidance system (S) according to any of the first embodiment and the first to third modes of the first embodiment, is provided where:

the server (7) includes:

(B7) map data storing means (SC2) which stores the map data constituting multiple unit maps within the predetermined range, the mobile terminal (1) includes:

(A16) map image producing means (KC5) which produces the map image within the possible range of display on the information display screen (11) based on the map data received;

(A17) unit map shortage determining means (KC5A) which determines whether unit map data is available to produce the map image when the map image producing means (KC5) produces the map image;

(A18) map request transmitting means (KC16B) which transmits unit map transmission requests for the server (7) to transmit the lacking unit map data as a map data transmission request if there is a lack of unit map data; and (A19) map data receiving means (KC1B) which receives the unit map data transmitted from the server (7).

Function of the Fourth Mode of the First Embodiment

In the route guidance system (S) of the fourth mode of the first embodiment including the above components, the map data storing means (SC2) of the server (7) stores the map data constituting data of the multiple unit maps within the predetermined range. The data of the unit maps transmitted by the server (7) is received by the map data receiving means (KC1B) of the mobile terminal (1). The map image producing means (KC5) of the mobile terminal (1) produces the map image within the possible range of display on the information display screen (11) based on the unit map data received. When the map image producing means (KC5) produces the map image, the unit map shortage determining means (KC5A) of the mobile terminal (1) determines whether unit map data is available to produce the map image. If such unit map data is not available, the map request transmitting means (KC16B) of the mobile terminal (1) transmits the unit map transmission request, which requests the server (7) to transmit the lacking unit map data.

In the route guidance system (S) of the fourth mode of the first embodiment, the map image is thus produced based on the unit map data stored in the mobile terminal (1). The guide map image is then produced by combining the produced map image and the route image. In contrast to prior art where it is not possible to recognize the route (RX) and the guide points (X5, X8) on unit maps which have not been received when a unit map image combined with a route image is transmitted from the server (7), in the route guidance system (S) of the fourth mode of the first embodiment, it is possible to recognize the guide points (X5, X8) from the route data received, independently of the existing unit map data.

Fifth Mode of the First Embodiment

In the fifth mode of the first embodiment, a route guidance system (S) is provided according to any one of the first embodiment, the first, second, third and fourth modes of the first embodiment, where:

the server (7) includes:

(B8) the route (RX) with a starting location (X1) on one end, and the destination location (X10) on the other end, and is formed by connecting multiple lines and curves in succession;

(B9) guide point candidate setting means (SC4) which sets guide point candidates (X1 to X10) comprising the points of connection between the lines and the curves forming the route (RX); and (B10) guide point setting means (SC5) which sets guide points (X5, X8) from among the guide point candidates (X1 to X10) according to predetermined conditions.

Function of the Fifth Mode of the First Embodiment

In the route guidance system (S) of the fifth mode of the first embodiment including the above components, the route (RX) produced by the server (7) is the successive connection of the multiple lines and curves while the starting location (X1) and the destination location (X10) represent the two ends of the route. The guide point candidate setting means (SC4) of the server (7) sets the guide point candidates (X1 to X10) constituted by the points of connection between the lines and curves forming the route (RX). The guide point setting means (SC5) of the server (7) then sets the guide points (X5, X8) from among the guide point candidates (X1 to X10) according to predetermined conditions. Therefore, with the route guidance system (S) of the fifth mode of the first embodiment, the server (7) can set the guide points (X5, X8) from among the guide point candidates (X1 to X10) of the route (RX), and can transmit the guide points (X5, X8) to the mobile terminal (1).

Sixth Mode of the First Embodiment

In the sixth mode of the first embodiment, the route guidance system (S) of the fifth mode of the first embodiment is provided, where:

the server (7) includes:

(B11) the map data storing means (SC2) which stores road data which is formed by connecting multiple lines and curves in succession along the center of roads (RA to RC) on a map, and includes position data (NA1 to NA10, NB1 to NB8, and NC1 to NC7) of the points of connection between the lines and curves;

(B12) the route producing means (SC3) which produces the route (RX) along the roads (RA to RC);

(B13) the guide point candidate setting means (SC4) which sets the connection points (NA4 to NA7, NB1 to NB4, and NC4 to NC6) arranged on the route (RX) as guide point candidates (X1 to X10);

(B14) route turn angle determining means (SC5A) which determines for a specific guide candidate point (Xi) whether a route turn angle ($\alpha i$) formed by a road (RA to RC) between a starting location side guide point candidate (Xi−1) situated on the starting location (X1) side of the specific guide point candidate (Xi) along the route (Rx) and the specific guide point candidate (Xi), and a road (RA to RC) between a destination location side guide point candidate (Xi+1) situated on the destination location (X10) side of the specific guide point candidate (Xi) along the route (Rx) and the specific guide point candidate (Xi) is equal to or less than a predetermined angle ($\alpha a$); and (B15) the guide point setting means (SC5) which sets the specific guide point candidate (Xi) to as guide point (X5, X8) if the route turn angle ($\alpha i$) is equal to or less than the predetermined angle ($\alpha a$).

Function of the Sixth Mode of the First Embodiment

In the route guidance system (S) of the sixth mode of the first embodiment including the above components, the map data storing means (SC2) of the server (7) stores the road data which is formed by connecting the multiple lines and curves along the center of the roads (RA to RC) on the map in succession, and includes data pertaining to the position of the connection points (NA1 to NA10, NB1 to NB8, and NC1 to NC7) of the lines and curves. The route producing means (SC3) of the server (7) produces the route (RX) along the roads (RA to RC). The guide point candidate setting means (SC4) of the server (7) then sets the connection points (NA4 to NA7, NB1 to NB4, and NC4 to NC6) arranged on the route (RX) as the guide point candidates (X1 to X10).

The route turn angle determining means (SC5A) of the server (7) determines for a specific guide point candidate (Xi) whether the route turn angle ($\alpha i$) formed by the road (RA to RC) between the starting location side guide point candidate (Xi−1) situated on the starting location (X1) side of the specific guide point candidate (Xi) along the route (RN) and the specific guide point candidate (Xi), and the road (RA to RC) between the destination location side guide point candidate (Xi+1) situated on the destination location (X10) side of the specific guide point candidate (Xi) along the route (RX) and the specific guide point candidate (Xi) is equal to or less than the predetermined angle ($\alpha a$). Then, if the route turn angle ($\alpha i$) is equal to or less than the predetermined angle ($\alpha a$), the guide point setting means (SC5) sets the specific guide point candidate (Xi) as the guide point (X5, X8). Therefore, in the route guidance system (S) of the sixth mode of the first embodiment, the guide points (X5, X8) are set based on the route turn angle ($\alpha i$). In particular, if the route (RX) has an angle equal to or less than the predetermined angle ($\alpha a$) due to an intersection or the like, the user can be notified of guide information.

SECOND EMBODIMENT

To achieve the above objects, in a second embodiment, a mobile terminal (1) is provided, comprising:

(A1) searching condition input means (KC2) which includes a searching condition entry image display means (KC2A) for displaying an image used to enter route searching conditions including a starting location (X1) and a destination location (X10) on an information display screen (11) which shows the image, and a searching condition storing means (KC2B) which stores the route searching conditions established by means of the input made to the route searching condition entry image;

(A2) searching condition transmitting means (KC16A) which transmits the route searching condition data to the server (7);

(A3) searching result receiving means (KC1A) which receives route data produced by the server (7) according to the route searching conditions, and represents a route (RX) from the starting location (X1) to the destination location (X10), from the server (7);

(A4) map request transmitting means (KC16B) which transmits map data requests for transmission of map data to the server (7);

(A5) map data receiving means (KC1B) which receives map data transmitted from the server (7);

(A6) route image producing means (KC7) which produces a route image based on the possible range of display on the information display screen (11), and the route data; and (A7) guide map image producing means (KC8) which produces a route guidance map image by combining the route image and a map image based on the map data;

(A8) current location measuring means (KC10) which measures the current location of the mobile terminal (1);

(A9) guide execution point setting means (KC11) which sets the guide points (X5, X8) situated along the nearest route (RX) between the current location and the destination location (X10), or the destination location (X10) as the guide execution point;

(A10) distance calculating means (KC12) which calculates the distance (Li) between the current location and the guide execution point based on data pertaining to the respective positions of the current location and the guide execution point; and (A11) guide information notifying means (KC14) which notifies the user of guide information based on the distance (Li) between the current location and the guide execution point.

Function of the Second Embodiment

In the mobile terminal (1) of the second embodiment including the above components, the searching condition entry image display means (KC2A) displays the image used to enter the route searching conditions including the starting location (X1) and the destination location (X10) on the information display screen (11), and the searching condition storing means (KC2B) stores the route searching conditions set by the entry to the route searching condition entry image. The searching condition transmitting means (KC16A) of the mobile terminal (1) transmits the route searching condition data to the server (7). The searching result receiving means (KC1A) receives the route data which is produced and transmitted by the server (7) according to the route searching conditions, and represents the route (RX) from the starting location (X1) to the destination location (X10).

The map request transmitting means (KC16B) of the mobile terminal (1) transmits the map data transmission requests for the transmission of map data to the server (i). The map data receiving means (KC1B) receives the map data transmitted from the server (7). The route image producing means (KC7) of the mobile terminal (1) then produces the route image based on the possible range of display on the information display screen (11) and the route data, and the guide map image producing means (KC8) of the mobile terminal (1) produces the route guidance map image by combining the route image and the map image based on the map data.

The current location measuring means (KC10) of the mobile terminal (1) of the second embodiment measures the current location of the mobile terminal (1). The guide execution point setting means (KC11) sets the guide points (X5, X8) situated along the nearest route (RX) between the current location and the destination location (X10), or the destination location (X10) as the guide execution point. The distance calculating means (KC12) calculates the distance (Li) between the current location and the guide execution point based on data pertaining to the respective positions of the current location and the guide execution point. Then, the guide information notifying means (KC14) notifies the user of the guide information based on the distance (Li) between the current location and the guide execution point.

Therefore, in the mobile terminal (1) of the second embodiment, the route guidance image is produced from the map data and the route data received as independent data, and shown on the information display screen (11). Moreover, since the route data includes data pertaining to the position of the guide points (X5, X8), the mobile terminal (1) can recognize the positions of the guide points (X5, X8). The mobile terminal (1) thus can recognize the positions of the guide points (X5, X8) regardless of the scope of the map data received by the mobile terminal (1), and can recognize the guide points (X5, X8) which are not within the scope of the map data received.

In addition, the mobile terminal (1) of the second embodiment is capable of recognizing the guide points (X5, X8) by means of the route data transmitted/received which is relatively small in quantity compared with the volume of transmitted/received route data and map data combined to form the route guidance map image. As a result, the quantity of the data to be transmitted/received can be reduced.

Further, the mobile terminal (1) of the second embodiment can notify the user of guide information such as the distance (Li) to the guide points (X5, X8) representing a corner, and the direction in which to make the turn at the guide points (X5, X8).

First Mode of the Second Embodiment

In the first mode of the second embodiment, the mobile terminal (1) of the second embodiment is provided, which includes:

(A12) guide voice storing means (KC14A1) which stores a guide voice for notifying the user that the distance (Li) between the current location and the guide execution point has reached a predetermined distance;

(A13) distance notification discriminating means (KC13) which determines whether the distance (Li) between the current location and the guide execution point has reached a predetermined distance; and (A14) the guide information notifying means (KC14) which includes guide voice reproducing means (KC14A) for reproducing the guide voice as guide information if a predetermined distance has been reached.

Function of the First Mode of the Second Embodiment

In the mobile terminal (1) of the first mode of the second embodiment including the above components, the guide voice storing means (KC14A1) stores the guide voice for notifying the user that the distance (Li) between the current location and the guide execution point has reached a predetermined distance. The distance notification discriminating means (KC13) determines whether the distance (Li) between the current location and the guide execution point has reached a predetermined distance for purposes of notifying the user. If the distance (Li) has reached a predetermined distance, the guide voice reproducing means (KC14A) reproduces the guide voice as guide information. It is thus possible to notify the user of the distance (Li) to the guide points (X5, X8) by means of the guide voice.

Second Mode of the Second Embodiment

In the second mode of the second embodiment, the mobile terminal (1) of the second embodiment or the first mode of the second embodiment, is provided, which includes:

(A15) the guide information notifying means (KC14) which includes notifying image display means (KC14B) which shows a notifying image (22f) indicating the distance (Li) between the current location and the guide execution point on the information display screen (11), as guide information.

Function of the Second Mode of the Second Embodiment

In the mobile terminal (1) of the second mode of the second embodiment including the above components, the notifying image display means (KC14B) displays the notifying image (22f) as guide information on the information display screen (11) showing the distance (Li) between the current location and the guide execution point. It is thus possible to notify the user of the distance (Li) to the guide point (X5, X8).

Third Mode of the Second Embodiment

In the third mode of the second embodiment, the mobile terminal (1) of the second embodiment or the first or second mode of the second embodiment is provided, which includes:

(A16') map image producing means (KC5) which produces the map image within the possible range of display on the information display screen (11) based on the map data constituting data of multiple unit maps within the predetermined scope, and transmitted from the server (7);

(A17) unit map shortage determining means (KC5A) which determines whether unit map data is available to produce the map image when the map image producing means (KC5) produces the map image;

(A18) map request transmitting means (KC16B) which transmits unit map transmission requests for the server (7) to transmit the lacking unit map data, as map data transmission requests, if there is a lack of unit map data; and (A19) map data receiving means (KC1B) which receives the unit map data transmitted from the server (7).

Function of the Third Mode of the Second Embodiment

In the mobile terminal (1) of the third mode of the second embodiment including the above components, the map data receiving means (KC1B) of the mobile terminal (1) receives the map data constituting the data of multiple unit maps within the predetermined scope, and is transmitted from the server (7). The map image producing means (KC5) of the mobile terminal (1) produces the map image within the possible range of display on the information display screen (11) based on the unit map data received. When the map image producing means (KC5) produces the map image, the unit map shortage determining means (KC5A) of the mobile terminal (1) determines whether unit map data is available to produce the map image. If there is a lack of unit map data, the map request transmitting means (KC16B) of the mobile terminal (1) transmits the unit map transmission request for the server (7) to transmit the lacking unit map data, as a map data transmission request.

In the mobile terminal (1) of the third mode of the second embodiment, the map image is thus produced based on the unit map data existing in the mobile terminal (1). The guide map image is then produced by combining the produced map image and the route image. While it is not possible for the mobile terminal of prior art to recognize the route (RX) and the guide points (X5, X8) on unit maps which have not been received, in the mobile terminal (1) of the third mode of the second embodiment, it is possible to recognize the guide points (X5, X8) from the route data received independently of the unit map data, where the unit map image combined with the route image is transmitted from the server (7).

THIRD EMBODIMENT

To achieve the above objects, in the third embodiment of the invention, a server (7) is provided, which includes:

(B1') searching condition receiving means (SC1A) which receives data of route searching conditions including a starting location (X1) and a destination location (X10) transmitted from a mobile terminal (1);

(B2) route producing means (SC3) which determines the route (RX) from the starting location (X1) to the destination location (X10) according to the route searching conditions received, and produces the route data consisting of data pertaining to the respective positions of the starting location (X1) and the destination location (X10), and data pertaining to the position of guide points (X5, X8) which are set in the course of the route (RX), for the purpose of notifying the user of guide information;

(B3) route data transmitting means (SC6A) which transmits the route data to the mobile terminal (1);

(B4) map data storing means (SC2) which stores map data;

(B5') map request receiving means (SC1B) which receives map data transmission requests coming from the mobile terminal (1) for transmission of map data to the mobile terminal (1); and (B6) map information transmitting means (SC6B) which transmits map data to the mobile terminal (1) corresponding to the map data transmission request.

Function of the Third Embodiment

In the server (7) according to the third embodiment including the above components, the searching condition receiving means (SC1A) receives the route searching condition data including the starting location (X1) and the destination location (X10) transmitted from the mobile terminal (1). The route producing means (SC3) determines the route (RX) from the starting location (X1) to the destination location (X10) according to the route searching conditions received, and produces the data of the route (RX) including data pertaining to the respective positions of the starting location (X1) and the destination location (X10), and data pertaining to the position of guide points (X5, X8) which are set in the course of the route (RX) for the purpose of notifying the user of guide information. The route data transmitting means (SC6A) transmits the route data to the mobile terminal (1).

On the other hand, the map request receiving means (SC1B) receives the map data transmission request transmitted from the mobile terminal (1) requesting the transmission of map data to the mobile terminal (1). The map information transmitting means (SC6B) transmits the map data which is stored in the map data storing means (SC2) to the mobile terminal (1) corresponding to the received map data transmission request.

The server (7) according to the third embodiment thus transmits the route data including data pertaining to the position of the guide points (X5, X8) independently of map data. The mobile terminal (1) thus can recognize the positions of the guide points (X5, X8) regardless of the map data it receives. In particular, the mobile terminal (1) can recognize the guide points (X5, X8) which are not within the scope of the map data received.

Moreover, since the server (7) according to the third embodiment can cause the mobile terminal (1), which receives the route data, to recognize the guide points (X5, X8) by means of the transmitted route data which is relatively small in quantity, compared with the volume of transmitted or received entire route data and map data combined to form the route guidance map image, the quantity of transmitted and received data can be reduced.

First Mode of the Third Embodiment

In the first mode of the third embodiment, the server (7) according to the third embodiment is provided, which includes:

(B7) map data storing means (SC2) which stores the map data constituting data of multiple unit maps within the predetermined scope.

Function of the First Mode of the Third Embodiment

In the server (7) according to the first mode of the third embodiment including the above components, the map data storing means (SC2) stores the map data constituting data of multiple unit maps within the predetermined scope. The server (7) of the first mode of the third embodiment thus transmits the unit map data as map data to the mobile terminal (1). While it is not possible for the mobile terminal of prior art to recognize the route (RX) and the guide points (X5, X8) on unit maps, where the unit map image combined with the route image is transmitted from the server to the mobile terminal, in the server (7) of the first mode of the third embodiment, the mobile terminal 1 is capable of recognizing the guide points (X5, X8) from the route data received, independently of the unit map data.

Second Mode of the Third Embodiment

In the second mode of the third embodiment, the server (7) according to the third embodiment or the first mode of the third embodiment is provided, which includes:

(B8) the route (RX) with a starting location (X1) on one end and a destination location (X10) on the other end, and is formed by connecting multiple lines and curves in succession;

(B9) guide point candidate setting means (SC4) which sets guide point candidates (X1 to X10) comprising the points of connection between the lines and the curves forming the route (RX); and (B10) guide point setting means (SC5) which sets guide points (X5, X8) from among the guide point candidates (X1 to X10) according to predetermined conditions.

Function of the Second Mode of the Third Embodiment

In the server (7) according to the second mode of the third embodiment, the route (RX) produced by the server (7) is the successive connection of multiple lines and curves while the starting location (X1) and the destination location (X10) represent the two ends of the route The guide point candidate setting means (SC4) sets the guide point candidates (X1 to X10) constituted by the points of connection between the lines and curves constituting the route (RX). The guide point setting means (SC5) then sets the guide points (X5, X8) from among the guide point candidates (X1 to X10) according to predetermined conditions. Therefore, the server (7) according to the second mode of the third embodiment can set the guide points (X5, X8) from among the guide point candidates (X1 to X10) of the route (RX), and can transmit the guide points (X5, X8) to the mobile terminal (1).

Third Mode of the Third Embodiment

In the third mode of the third embodiment, the server (7) according to the second mode of the third embodiment is provided, which includes:

(B11) the map data storing means (SC2) which stores road data that is formed by connecting multiple lines and curves in succession along the center of roads (RA to RC) on a map, and includes position data (NA1 to NA10, NB1 to NB8, and NC1 to NC6) of the points of connection between the lines and curves;

(B12) the route producing means (SC3) which produces the route (RX) along the roads (RA to RC);

(B13) the guide point candidate setting means (SC4) which sets the connection points (NA4 to NA7, NB1 to NB4, and NC4 to NC6) arranged on the route (RX) as the guide point candidates (X1 to X10);

(B14) route turn angle determining means (SC5A) which determines for a specific guide candidate point (Xi) whether a route turn angle ($\alpha$i) formed by a road (RA to RC) between the starting location side guide point candidate (Xi−1) situated on the starting location (X1) side of the specific guide point candidate (Xi) along the route (Rx) and the specific guide point candidate (Xi), and a road (RA to RC) between the destination location side guide point candidate (Xi+1) situated on the destination location (X10) side of the specific guide point candidate (Xi) along the route (Rx) and the specific guide point candidate (Xi) is equal to or less than a predetermined angle (αa); and (B15) the guide point setting means (SC5) which sets the specific guide point candidate (Xi) as the guide point (X5, X8) if the route turn angle (αi) is equal to or less than the predetermined angle (αa).

Function of the Third Mode of the Third Embodiment

In the server (7) according to the third mode of the third embodiment including the above components, the map data storing means (SC2) stores the road data which is formed by connecting the multiple lines and curves in succession along the center of the roads (RA to RC) on the map, and includes data pertaining to the position of the connection points (NA1 to NA10, NB1 to NB8, and NC1 to NC6) of the lines and curves. The route producing means (SC3) produces the route (RX) along the roads (RA to RC). The guide point candidate setting means (SC4) then sets the connection points (NA4 to NA7, NB1 to NB4, and NC4 to NC6) arranged on the route (RX) as guide point candidates (X1 to X10).

The route turn angle determining means (SC5A) determines for the specific guide point candidate (Xi) whether the route turn angle (αi) formed by the road (RA to RC) between the starting location side guide point candidate (Xi−1) situated on the starting location (X1) side of the specific guide point candidate (Xi) along the route (RX) and the specific guide point candidate (Xi), and the road (RA to RC) between the destination location side guide point candidate (Xi+1) situated on the destination location (X10) side of the specific guide point candidate (Xi) along the route (RX) and the specific guide point candidate (Xi) is equal to or less than the predetermined angle (αa). Then, if the route turn angle (αi) is equal to or less than the predetermined angle (αa), the guide point setting means (SC5) sets the specific guide point candidate (Xi) as the guide points (X5, X8). Therefore, in the server (7) according to the third mode of the third embodiment, the guide points (X5, X8) are set based on the route turn angle (αi). In particular, if the route (RX) has an angle equal to or less than the predetermined angle (αa) due to an intersection or the like, the user can be notified of guide information.

FOURTH EMBODIMENT

To achieve the above objects, a program is provided in the fourth embodiment of the invention for causing a computer constituting a mobile terminal (1) to execute functions including:

searching condition input means (KC2) composed of a searching condition entry image display means (KC2A) for displaying an image used to enter route searching conditions including a starting location (X1) and a destination location (X10) on an information display screen (11) which shows the image, and searching condition storing means (KC2B) which stores the route searching conditions set by means of the input to the route searching condition entry image;

searching condition transmitting means (KC16A) which transmits the route searching condition data to the server (7);

searching result receiving means (KC1A) which receives route data which is produced by the server (7) according to the route searching conditions, and represents a route (RX) from the starting location (X1) to the destination location (X10), from the server (7);

map request transmitting means (KC16B) which transmits map data requests for transmission of map data to the server (7);

map data receiving means (KC1B) which receives map data transmitted from the server (7);

route image producing means (KC7) which produces a route image based on route data and the possible range of display on the information display screen (11);

guide map image producing means (KC8) which produces a route guidance map image by combining the route image and a map image based on the map data;

current location measuring means (KC10) which measures a current location of the mobile terminal (1);

guide execution point setting means (KC11) which sets the guide points (X5, X8) situated along the nearest route (RX) between the current location and the destination location (X10), or the destination location (X10) as the guide execution point;

distance calculating means (KC12) which calculates a distance (Li) between the current location and the guide execution point based on data pertaining to the respective positions of the current location and the guide execution point; and guide information notifying means (KC14) which notifies the user of the guide information based on the distance (Li) between the current location and the guide execution point.

Function of the Fourth Embodiment

In the program of the mobile terminal (1) of the fourth embodiment including the above components, the searching condition entry image display means (KC2A) displays the image used to enter the route search conditions including the starting location (X1) and the destination location (X10) on the information display screen (11), and the searching condition storing means (KC2B) stores the route search conditions set by the entry to the route searching condition entry image. The searching condition transmitting means (KC16A) transmits the route searching condition data to the server (7). The searching result receiving means (KC1A) receives the route data which is produced and transmitted by the server (7) according to the route searching conditions, and represents the route (RX) from the starting location (X1) to the destination location (X10).

The map request transmitting means (KC16B) transmits the map data transmission request for the transmission of map data to the server (7). The map data receiving means (KC1B) receives the map data transmitted from the server (7). The route image producing means (KC7) then produces the route image based on the possible range of display on the information display screen (11), and the route data, and the guide map image producing means (KC8) produces the route guidance map image by combining the route image and the map image based on the map data.

The current location measuring means (KC10) measures the current location of the mobile terminal (1). The guide execution point setting means (KC11) sets the guide points (X5, X8) situated along the nearest route (RX) between the current location and the destination location (X10), or the destination location (X10) as the guide execution point. The distance calculating means (KC12) calculates the distance (Li) between the current location and the guide execution point based on data pertaining to the respective positions of the current location and the guide execution point. Then, the guide information notifying means (KC14) notifies the user of the guide information based on the distance (Li) between the current location and the guide execution point.

Therefore, in the program of the mobile terminal (1) of the fourth embodiment, the mobile terminal (1) produces the route guidance image based on the map data and the route data received as independent data, and shows the route guidance image on the information display screen (11). Moreover, since the route data includes data pertaining to the position of the guide points (X5, X8), the mobile terminal (1) can recognize the positions of the guide points (X5, X8) regardless of the map data received by the mobile terminal (1), and can also recognize the guide points (X5, X8) which are not within the scope of the map data received.

In addition, in the program of the mobile terminal (1) of the fourth embodiment, the mobile terminal (1) can recognize the guide points (X5, X8) by means of the transmission/reception of route data which is relatively small in quantity, in contrast to the case of prior art where the production of a route guidance map image by combining the route data and the map data received involves voluminous data. Accordingly, in the mobile terminal (1) of the fourth embodiment, the quantity of the data to be transmitted/received can be reduced.

Further, the program of the mobile terminal (1) of the fourth embodiment can notify the user of the guide information such as the distance (Li) to the guide points (X5, X8) representing a corner, and the direction in which to make the turn at the guide points (X5, X8).

First Mode of the Fourth Embodiment

In the first mode of the fourth embodiment, the program of the mobile terminal (1) of the fourth embodiment for causing a computer constituting the mobile terminal (1) to execute functions is provided, which includes:

guide voice storing means (KC14A1) which stores a guide voice used for notifying the user that the distance (Li) between the current location and the guide execution point has reached a predetermined distance;

distance notification discriminating means (KC13) which determines whether the distance (Li) between the current location and the guide execution point has reached a predetermined distance; and the guide information notifying means (KC14) comprising a guide voice reproducing means (KC14A) which reproduces the guide voice as guide information if a predetermined distance has been reached.

Function of the First Mode of the Fourth Embodiment

In the program of the mobile terminal (1) of the first mode of the fourth embodiment including the above components, the guide voice storing means (KC14A1) stores the guide voice used for notifying the user that the distance (Li) between the current location and the guide execution point has reached a predetermined distance. The distance notification discriminating means (KC13) determines whether the distance (Li) between the current location and the guide execution point has reached a predetermined distance for notification purposes. If the distance (Li) has reached the predetermined distance, the guide voice reproducing means (KC14A) reproduces the guide voice as guide information. It is thus possible to notify the user of the distance (Li) to the guide points (X5, X8) by means of the guide voice.

Second Mode of the Fourth Embodiment

In the second mode of the fourth embodiment, there is provided the program of the mobile terminal (1) of the fourth aspect or the first mode of the fourth embodiment for causing a computer constituting the mobile terminal (1) to execute functions including:

the guide information notifying means (KC14) which includes notifying image display means (KC14B) which shows a notifying image (22*f*) indicating the distance (Li) between the current location and the guide execution point on the information display screen (11) as guide information.

Function of the Second Mode of the Fourth Embodiment

In the program of the mobile terminal (1) of the second mode of the fourth embodiment including the above components, the notifying image display means (KC14B) displays the notifying image (22*f*) as guide information on the information display screen (11) showing the distance (Li) between the current location and the guide execution point. It is thus possible to notify the user of the distance (Li) to the guide points (X5, X8).

Third Mode of the Fourth Embodiment

In the third mode of the fourth embodiment, the program of the mobile terminal (1) of the fourth embodiment or the first or second mode of the fourth embodiment is provided for causing a computer constituting the mobile terminal (1) to execute functions which include:

map image producing means (KC5) which produces the map image within the possible range of display on the information display screen (11) based on the map data constituting multiple unit maps within the predetermined scope, and transmitted from the server (7);

unit map shortage determining means (KC5A) which determines whether unit map data is available to produce the map image when the map image producing means (KC5) produces the map image;

map request transmitting means (KC16B) which transmits unit map transmission requests for the server (7) to transmit the lacking unit map data, as map data transmission requests if there is a lack of unit map data; and map data receiving means (KC1B) which receives the unit map data transmitted from the server (7).

Function of the Third Mode of the Fourth Embodiment

In the program of the mobile terminal (1) of the third mode of the fourth embodiment including the above components, the map data receiving means (KC1B) of the mobile terminal (1) receives the map data constituting data of multiple unit maps within the predetermined scope, and is transmitted from the server (7). The map image producing means (KC5) of the mobile terminal (1) produces the map image within the possible range of display on the information display screen (11) based on the unit map data received. When the map image producing means (KC5) produces the map image, the unit map shortage determining means (KC5A) of the mobile terminal (1) determines whether the unit map data is available to produce the map image. If there is a lack of unit map data, the map request transmitting means (KC16B) of the mobile terminal (1) transmits the unit map transmission request for the server (7) to transmit the lacking unit map data, as a map data transmission request.

In the program of the mobile terminal (1) of the third mode of the fourth embodiment, the map image is thus produced based on the unit map data existing in the mobile terminal (1). The guide map image is then produced by combining the produced map image and the route image. While it is not possible for a mobile terminal of prior art to recognize the route (RX) and the guide points (X5, X8) on unit maps which have not been received where the unit map image combined with the route image is transmitted from the server (7), it is possible for the program of the mobile terminal (1) of the third mode of the fourth embodiment to recognize the guide points (X5, X8) from the route data received, independently of the unit map data.

FIFTH EMBODIMENT

To achieve the above objects, the fifth embodiment of the invention provides for a program which causes a computer constituting a server (7) to execute functions including:

searching condition receiving means (SC1A) which receives data of route searching conditions including a starting location (X1) and a destination location (X10) transmitted from a mobile terminal (1);

route producing means (SC3) which determines the route (RX) from the starting location (X1) to the destination location (X10) according to the route searching conditions received, and produces data of the route (RX) including data pertaining to the respective positions of the starting location (X1) and the destination location (X10), and data pertaining to the position of guide points (X5, X8) which are set in the course of the route (RX) for the purpose of notifying the user of guide information;

route data transmitting means (SC6A) which transmits the route data to the mobile terminal (1);

map data storing means (SC2) which stores map data;

map request receiving means (SC1B) which receives map data transmission requests transmitted from the mobile terminal (1) for the transmission of map data to the mobile terminal (1); and map information transmitting means (SC6B) which transmits the map data to the mobile terminal (1) corresponding to the map data transmission request.

Function of the Fifth Embodiment

In the program of the server (7) according to the fifth embodiment including the above components, the searching condition receiving means (SC1A) receives the route searching condition data including the starting location (X1) and the destination location (X10) transmitted from the mobile terminal (1). The route producing means (SC3) determines the route (RX) from the starting location (X1) to the destination location (X10) according to the route searching conditions received, and produces the route data (RX) including data pertaining to the respective positions of the starting location (X1) and the destination location (X10), and data pertaining to the position of the guide points (X5, X8) which are set in the course of the route (RX) for the purpose of notifying the user of guide information. The route data transmitting means (SC6A) transmits the route data to the mobile terminal (1).

On the other hand, the map request receiving means (SC1B) receives the map data transmission requests transmitted from the mobile terminal (1) for the transmission of map data to the mobile terminal (1). The map information transmitting means (SC6B) transmits the map data which is stored in the map data storing means (SC2) to the mobile terminal (1) corresponding to the received map data transmission request.

In the program of the server (7) according to the fifth embodiment, the server (7) thus transmits the route data including data pertaining to the position of the guide points (X5, X8), independently of the map data. Thus, the mobile terminal (1) can recognize the positions of the guide points (X5, X8) regardless of the map data received by the mobile terminal (1). In particular, the mobile terminal (1) can recognize the guide points (X5, X8) which are not within the scope of the map data received.

Moreover, in the program of the server (7) according to the fifth embodiment, the mobile terminal (1), which receives the route data from the server (7), can recognize the guide points (X5, X8) by means of the transmission of the route data which is relatively small in quantity, compared with the volume of transmitted/received entire route data and map data combined to form the route guidance map image. Therefore, the quantity of transmitted and received data can be reduced.

First Mode of the Fifth Embodiment

In the first mode of the fifth embodiment, the program of the server (7) according to the fifth embodiment is provided for causing a computer constituting the server (7) to execute functions including:

the route (RX) with a starting location (X1) on one end and the destination location (X10) on the other end, and is formed by connecting multiple lines and curves in succession;

guide point candidate setting means (SC4) which sets guide point candidates (X1 to X10) comprising the points of connection between the lines and the curves forming the route (RX); and guide point setting means (SC5) which sets guide points (X5, X8) from among the guide point candidates (X1 to X10) according to predetermined conditions.

Function of the First Mode of the Fifth Embodiment

In the program of the server (7) according to the first mode of the fifth embodiment including the above components, the map data storing means (SC2) stores the map data constituting data of multiple unit maps within the predetermined scope. The server (7) of the first mode of the fifth embodiment transmits the unit map data as map data to the mobile terminal (1). While it is not possible for the mobile terminal of prior art to recognize the route (RX) and the guide points (X5, X8) on unit maps which have not been received and where the unit map image combined with the route image is transmitted from the server (7), in the program of the server (7) according to the first mode of the fifth embodiment, it is possible for the mobile terminal (1) to recognize the guide points (X5, X8) from the route data received, independently of the unit map data.

Second Mode of the Fifth Embodiment

In the second mode of the fifth embodiment, the program of the server (7) according to the first mode of the fifth embodiment is provided for causing a computer constituting the server (7) to execute functions including:

the map data storing means (SC2) which stores road data which is formed by connecting multiple lines and curves in succession along the center of roads (RA to RC) on a map, and includes position data (NA1 to NA10, NB1 to NB8, and NC1 to NC6) of the points of connection between the lines and curves;

the route producing means (SC3) which produces the route (RX) along the roads (RA to RC);

the guide point candidate setting means (SC4) which sets the connection points (NA4 to NA7, NB1 to NB4, and NC4 to NC6) arranged on the route (RX) as guide point candidates (X1 to X10);

route turn angle determining means (SC5A) which determines for a specific guide candidate point (Xi) whether a route turn angle (αi) formed by a road (RA to RC) between a starting location side guide point candidate (Xi−1) situated on the starting location (X1) side of the specific guide point candidate (Xi) along the route (Rx) and the specific guide point candidate (Xi), and a road (RA to RC) between a destination location side guide point candidate (Xi+1) situated on the destination location (X10) side of the specific guide point candidate (Xi) along the route (Rx) and the specific guide point candidate (Xi) is equal to or less than a predetermined angle (αa); and the guide point setting means (SC5) which sets the specific guide point candidate (Xi) as the guide points (X5, X8) if the route turn angle (αi) is equal to or less than the predetermined angle (αa).

Function of the Second Mode of the Fifth Embodiment

In the program of the server (7) according to the second mode of the fifth embodiment including the above components, the route (RX) produced by the server (7) is the successive connection of the multiple lines and curves while the starting location (X1) and the destination location (X10) represent the two ends of the route. The guide point candidate setting means (SC4) sets the guide point candidates (X1 to X10) constituted by the points of connection between the lines and curves forming the route (RX). The guide point setting means (SC5) then sets the guide points (X5, X8) from among the guide point candidates (X1 to X10) according to predetermined conditions. Therefore, in the program of the server (7) according to the second mode of the fifth embodiment, the server (7) can set the guide points (X5, X8) from among the guide point candidates (X1 to X10) of the route (RX), and can transmit data pertinent to the guide points (X5, X8) to the mobile terminal (1).

Third Mode of the Fifth Embodiment

In the third mode of the fifth embodiment, the program of the server (7) according to the second mode of the fifth embodiment is provided for causing a computer constituting the server (7) to execute functions including:

the map data storing means (SC2) which stores road data which is formed by connecting multiple lines and curves in succession along the center of roads (RA to RC) on a map, and includes position data (NA1 to NA10, NB1 to NB8, and NC1 to NC6) of the points of connection between the lines and curves;

the route producing means (SC3) which produces the route (RX) along the roads (RA to RC);

the guide point candidate setting means (SC4) which sets the connection points (NA4 to NA7, NB1 to NB4, and NC4 to NC6) arranged on the route (RX) as guide point candidates (X1 to X10);

route turn angle determining means (SC5A) which determines for a specific guide point candidate (Xi) whether a route turn angle (αi) formed by a road (RA to RC) between a starting location side guide point candidate (Xi−1) situated on the starting location (X1) side of the specific guide point candidate (Xi) along the route (RX) and the specific guide point candidate (Xi), and a road (RA to RC) between a destination location side guide point candidate (Xi+1) situated on the destination location (X10) side of the specific guide point candidate (Xi) along the route (RX) and the specific guide point candidate (Xi) is equal to or less than a predetermined angle (αa); and the guide point setting means (SC5) which sets the specific guide point candidate (Xi) to the guide points (X5, X8) if the route turn angle (αi) is equal to or less than the predetermined angle (αa).

Function of the Third Mode of the Fifth Embodiment

In the program of the server (7) according to the third mode of the fifth embodiment including the above components, the map data storing means (SC2) stores the road data which is formed by connecting the multiple lines and curves in succession along the center of the roads (RA to RC) on the map, and includes data pertaining to the position of the connection points (NA1 to NA10, NB1 to NB8, and NC1 to NC6) of the lines and curves. The route producing means (SC3) produces the route (RX) along the roads (RA to RC). The guide point candidate setting means (SC4) then sets the connection points (NA4 to NA7, NB1 to NB4, and NC4 to NC6) arranged on the route (RX) as guide point candidates (X1 to X10).

The route turn angle determining means (SC5A) determines for a specific guide point candidate (Xi) whether the route turn angle (αi) formed by the road (RA to RC) between the starting location side guide point candidate (Xi−1) situated on the starting location (X1) side of the specific guide point candidate (Xi) along the route (RX) and the specific guide point candidate (Xi), and the road (RA to RC) between the destination location side guide point candidate (Xi+1) situated on the destination location (X10) side of the specific guide point candidate (Xi) along the route (RX) and the specific guide point candidate (Xi) is equal to or less than the predetermined angle (αa). Then, if the route turn angle (αi) is equal to or less than the predetermined angle (αa), the guide point setting means (SC5) sets the specific guide point candidate (Xi) as the guide points (X5, X8). Therefore, in the program of the server (7) according to the third mode of the fifth embodiment, the guide points (X5, X8) are set based on the route turn angle (αi). In particular, if the route (RX) has an angle equal to or less than the predetermined angle (αa) due to an intersection or the like, the user can be notified of guide information.

SIXTH EMBODIMENT

In the sixth embodiment of the invention, a computer-readable recording medium is provided for recording the program of any one of the fourth embodiment, the first to third modes of the fourth embodiment, the fifth embodiment, and the first to third modes of the fifth embodiment. It is thus possible to record the program of any one of the fourth embodiment, the first to third modes of the fourth embodiment, the fifth embodiment, and the first to third modes of the fifth embodiment in the computer-readable recording medium such as a ROM (Read Only Memory), a RAM (Random Access Memory), a hard disk, a CD (Compact Disk), a DVD (Digital Versatile Disk), and an MO disk (Magneto-Optical disk), and to cause a computer to read and to execute the program.

The above-described present invention enables the mobile terminal to recognize the guide points.

Moreover, the present invention can notify the user of the distance to the guide point and the direction in which to make the turn at the guide point.

Further, the present invention can control the amount of data transmitted/received between the mobile terminal and the server when the map data for navigation and the like are transmitted/received.

BRIEF DESCRIPTION OF THE DRAWINGS

FIG. 3 illustrates a route searching condition image according to the first embodiment;

FIGS. 10A to 10J illustrate images displayed on the information display screen of the mobile terminal of the first embodiment while a particular route guidance is taking place, in which:

FIG. 10A illustrates a route candidate list image of the received route candidates;

FIG. 10B illustrates a route guidance image and a guide voice respectively shown and reproduced at the start of the route guidance;

FIG. 10C illustrates a route guidance image shown during the route guidance;

FIG. 10D illustrates a route guidance image and a reproduced guide voice when the distance to a guide point has reached 100 m;

FIG. 10E illustrates a route guidance image and a reproduced guide voice when the distance to the guide point has reached 50 m;

FIG. 10F illustrates a route guidance image and a reproduced guide voice in the vicinity of the guide point;

FIG. 10G illustrates a route guidance image and a reproduced guide voice when the distance to a destination location has reached 50 m;

FIG. 10H illustrates a route guidance image and a reproduced guide voice in the vicinity of the destination location;

FIG. 10I illustrates a displayed map image if a particular route guidance map is selected; and FIG. 10J illustrates a displayed a sub-menu image if a particular sub-menu is selected;

DETAILED DESCRIPTION OF THE PREFERRED EMBODIMENTS

The embodiments of the present invention (specific examples) of the present invention will be described hereafter with reference to the drawings. The invention however is not intended to be limited to the following embodiments.

First Embodiment

Figure 1:
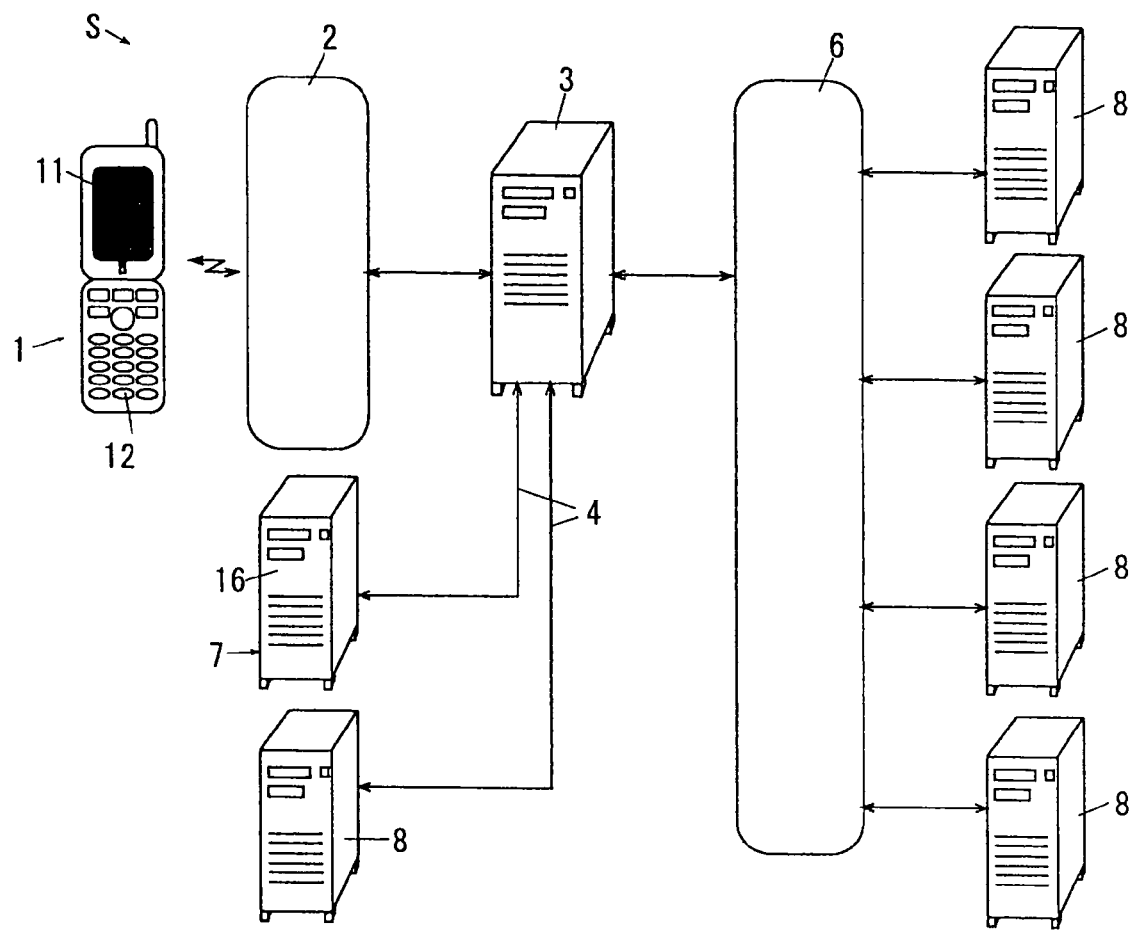
FIG. 1 illustrates a route guidance system of the first embodiment of the present invention.

FIG. 1 illustrates a route guidance system of the first embodiment of the present invention;

In FIG. 1, the route guidance system S of the first embodiment includes a mobile phone 1 as the portable mobile terminal. The mobile phone 1 is connected to a data communication device 3 of a mobile communication company via a mobile phone network 2. The data communication device 3 is further connected to a route guidance data delivery server 7 and information delivery servers 8 of other information providers (i.e., contents provider and application service provider) via dedicated lines 4 and the Internet 6. Although the route guidance data delivery server 7 is connected to the data communication device 3 via the dedicated line 4 according to the first embodiment, the connection may be provided via the Internet 6.

The mobile phone 1 according to the first embodiment includes an information display screen 11 which displays images, and input keys 12 used for various inputs, and is provided with a memory device (recording medium) which stores programs and the like. A Global Positioning System (GPS) device which can measure a three-dimensional current location of the mobile phone 1 is incorporated therein.

Moreover, the route guidance data delivery server 7 includes a server main unit 16, a display (not shown), input devices such as a keyboard and a mouse (not shown), a hard disk drive (recording medium, not shown), and an optical drive such as a CD drive (recording medium reader, not shown).

Description of the Control Section of the Mobile Phone 1

Figure 2:
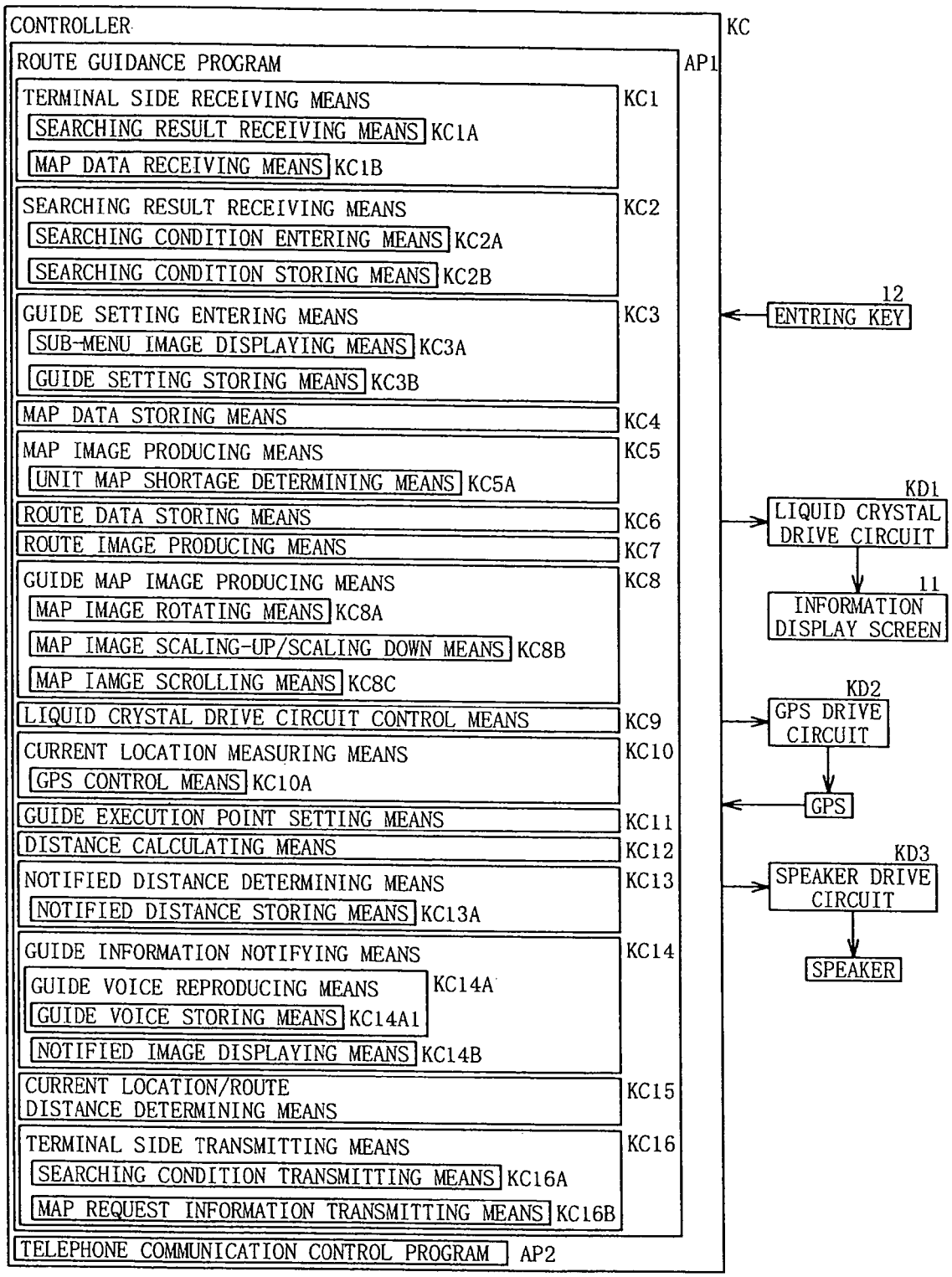
FIG. 2 is a functional block diagram illustrating the functions of a mobile terminal of the route guidance system shown in FIG. 1.

FIG. 2 is a functional block diagram illustrating the functions of a mobile terminal of the route guidance system shown in FIG. 1;

In FIG. 2, a controller KC of the mobile phone 1 is constituted by an I/O (input/output interface (I/O) which delivers input/output signals from/to the outside and adjusts the levels of input/output signals and the like, a ROM (Read Only Memory, recording medium) which stores programs, data, and the like for necessary processing, a RAM (Random Access Memory, recording medium) which temporarily stores necessary data, a CPU (Central Processing Unit) which executes processing according to the programs stored in the ROM and the like, and a microcomputer which includes a clock oscillator and executes the programs stored in the ROM and the like to carry out various functions.

(Signal Input Elements Connected to the Controller KC of the Mobile Phone)

The controller KC of the mobile phone 1 receives signals from other signal input elements such as the input keys 12 and the GPS device.

The input keys 12 detect an input signal input by the user, and input the detected signal into the controller KC.

The GPS device measures the position of the mobile phone 1 on the ground based on arrival times of time signals emitted from satellites and the like in response to an input signal for starting measurement, and inputs the measured result into the controller KC.

(Control Elements Connected to the Controller KC of Mobile Phone)

Moreover, the controller KC of the mobile phone 1 is connected to a liquid crystal drive circuit KD1, a GPS drive circuit KD2, a speaker drive circuit KD3, a power supply circuit (not shown), and other control elements, and outputs the operation control signals thereof.

The liquid crystal drive circuit KD1 controls the on/off of display electrodes of the liquid crystal display panel, and displays images on the information display screen 11.

The GPS drive circuit KD2 outputs the signal to the GPS device to start locating, thereby driving the same.

The speaker drive circuit KD3 controls a voice signal to output a voice and a sound effect from a speaker.

(Functions of the Controller KC of Mobile Phone

The controller KC of the mobile phone 1 includes a route guidance program (navigation software) AP1, a telephone communication control program AP2, and other programs, and has a function (control means) which executes processing according to output signals generated by the respective signal output elements, thereby outputting the control signals to the respective control elements. The function (control means) of an application program for a map display of the controller KC will be described later.

It should be noted that the telephone communication control program AP2 is a program which controls the telephone communication operation of the mobile phone 1, and can employ various publicly-known conventional technologies. A detailed description thereof is thus omitted.

KC1: Terminal Side Receiving Means

The terminal side receiving means KC1 includes searching result receiving means KC1A and map data receiving means KC1B, and receives map data and the like transmitted from the route guidance data delivery server 7.

KC1A: Searching Result Receiving Means

The searching result receiving means KC1A receives route data representing a route from a starting location to a destination location, which is produced by the route guidance data delivery server 7 according to route searching conditions transmitted from the mobile phone 1.

KC1B: Map Data Receiving Means

The map data receiving means KC1B of the first embodiment receives the map data comprising unit maps within a predetermined scope transmitted from the server.

KC2: Searching Condition Input Means

Searching condition input means KC2 includes searching condition entry image display means KC2A, and searching condition storing means KC2B, and sets searching conditions such as a starting location and a destination location used to search a route based on the user's input.

FIG. 3 illustrates a route searching condition image according to the first embodiment.

KC2A: Searching Condition Entry Image Display Means

The searching condition entry image display means KC2A displays an image (searching condition entry image, refer to FIG. 3) used for entering route searching conditions such as a starting location and a destination location on the information display screen which displays the image. As shown in FIG. 3, the searching condition entry image of the first embodiment shows a starting location entry field used to enter a starting location, a destination location entry field used to enter a destination location, a date and time entry field used to enter the time and date of departure or arrival of the route guidance, a searching number entry field used to enter the number of routes to be searched for, a transportation means entry field used to enter the particular transportation means used for the route guidance, and a searching condition transmitting icon used to transmit the searching conditions to the server 7.

KC2B: Searching Condition Storing Means

The searching condition storing means KC2B stores the route searching conditions (such as the starting location, the destination location, and the date and time of departure) set by an entry made to the route searching condition entry image (refer to FIG. 3).

KC3: Guide Setting Input Means

The guide setting input means KC3 includes a sub-menu image display means KC3A and a guide setting storing means KC3B, and establishes whether voice guidance is carried out while route guidance (guide) is taking place.

KC3A: Sub-Menu Image Display Means

The sub-menu image display means KC3A shows a sub-menu image (described later, refer to FIG. 10J) used to indicate whether the voice guide is carried out while route guidance is taking place, or whether a route guidance map image is automatically scrolled, and the like.

KC3B: Guide Setting Storing Means

The guide setting storing means KC3B stores the guide setting established by means of an input made to the sub-menu image.

KC4: Map Data Storing Means

The map data storing means KC4 stores the map data (unit map data) received by the map data receiving means KC1B.

Figure 4:
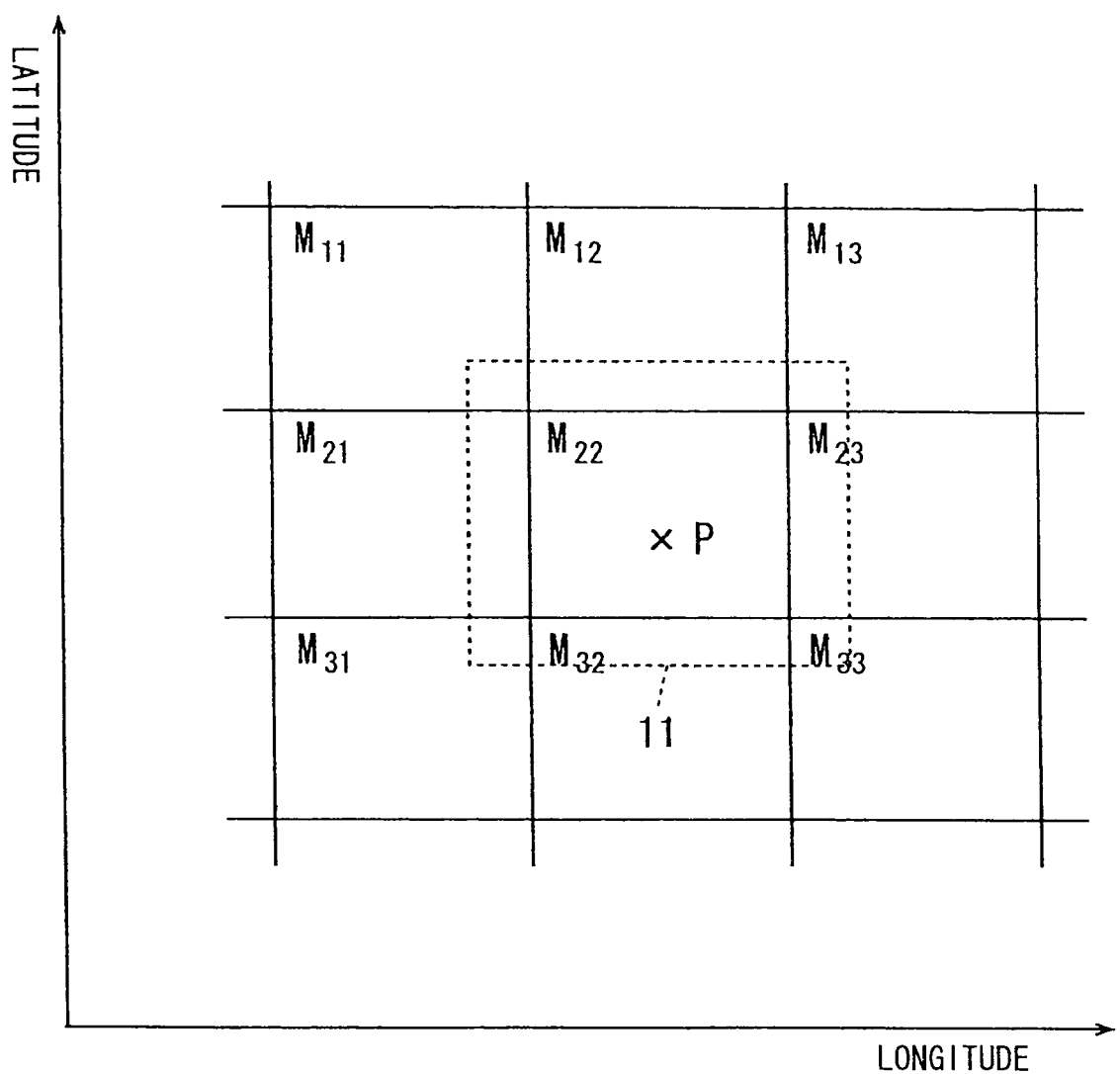
FIG. 4 illustrates the relationship between unit map data and an information display screen of a mobile terminal of the first embodiment when a map image is produced and displayed on the mobile terminal.

FIG. 4 illustrates the relationship between unit map data and the information display screen of a mobile terminal of the first embodiment when a map image is produced and displaced on the mobile terminal;

KC5: Map Image Producing Means

The map image producing means KC5 includes unit map shortage determining means KC5A, and produces a map image within the display range of the information display screen 11 based on the map data (unit map data) received and stored in the map data storing means KC4. As shown in FIG. 4, the map image producing means KC5 of the first embodiment produces a map image (the map image within the area marked and enclosed by means of dotted lines in FIG. 4) corresponding to the size in which it can be displayed on the information display screen 11 within the vicinity of a current location P as the center based on received nine map images M11 to M33. The map image producing means KC5 of the first embodiment then produces a map image based on data of multiple unit maps comprising vector map data including image identifying data, which identifies icon images representing map symbols and land marks, and palette images representing roads and railroads, as well as position data which identifies the positions at which the identified images are located similar to the technology described in Patent Document 1.

KC5A: Unit Map Shortage Determining Means

The unit map shortage determining means KC5A determines whether the unit map data is sufficient to produce the map image when the map image producing means produces the map image. The unit map shortage determining means KC5A according to the first embodiment determines whether the unit maps are sufficient by determining whether the possible range of display on the information display screen 11 is partially or entirely outside the scope of the unit maps M11 to M33 when the map image is produced in the vicinity of the current location P shown in the center in FIG. 4.

KC6: Route Data Storing Means

The route data storing means KC6 stores the route data received by the searching result receiving means KC1A. The route data storing means KC6 according to the first embodiment stores route data of the entire route from the starting location to the destination location, and includes data pertaining to the position of guide points at which the user will be notified of guide information, directions in which to turn at the guide points, and the respective positions of the starting location and the destination location.

KC7: Route Image Producing Means

Route image producing means KC7 produces a route image based on the possible range of display on the information display screen 11 and the route data stored in the route data storing means KC6.

KC8: Guide Map Image Producing Means

The guide map image producing means KC8 is composed of a map image rotating means KC8A, a map image scaling-up/scaling-down means KC8B, and a map image scrolling mean KC8C, and creates a route guidance map image by combining the map image produced by the map image producing means KC5 and the route image produced by the route image producing means KC7.

KC8A: Map Image Rotating Means

The map image rotating mean KC8A causes the route guidance map image to rotate with, respect to the information display screen 11 based on the user's input. The map image rotating means KC8A according to the first embodiment does not cause the displayed route guidance map image to rotate directly, but produces the route guidance map image after rotation by combining the map image produced by the map image producing means KC5 after rotation and the route image produced by the route image producing means KC7 after rotation.

KC8B: Map Image Scaling-Up/Scaling-Down Means

The map image scaling-up/scaling-down means KC8B scales the route guidance map image shown on the information display screen 11 up/down based on the user's input (changes the scale of the route guidance map image to be shown). The map image scaling-up/scaling-down means KC8B according to the first embodiment does not directly scale up/down a displayed route guidance map image, but produces the route guidance map image after scaling up/down by combining the map image produced by the map image producing means KC5 after the scaling up/down and the route image produced by the route image producing means KC7 after the scaling up/down.

KC8C: Map Image Scrolling Means

The map image scrolling means KC8C scrolls the route guidance map image for moving the range to be displayed upward/downward and leftward/rightward based on the user's input. The map image scrolling means KC8C according to the first embodiment produces a route guidance map image by combining the map image produced by the map image producing means KC5 after scrolling and the route image produced by the route image producing means KC7 after scrolling.

KC9: Liquid Crystal Drive Circuit Control Means

The liquid crystal drive circuit control means KC9 controls the liquid crystal drive circuit KD1 to display the route guidance map image produced by the guide map image producing means KC8 on the information display screen 11.

KC10: Current Location Measuring Means

The current location measuring means KC10 includes a GPS control means KC10A, and measures the current location of the mobile phone 1.

KC10A: GPS Control Means

The GPS control means KC10A controls the driving operation of the GPS device via the GPS drive circuit KD2, and measures the current location of the mobile phone 1 by means of the GPS device according to a predetermined input signal or at a predetermined time interval. In particular, if route guidance (navigation) is carried out by means of the map image shown on the information display screen 11, the current location is measured at predetermined time intervals (five-second intervals, for example), and if the "starting location" entry field is set to "GPS" as the searching condition during transmission to the server 7 (refer to FIG. 3), the GPS device is made to measure the current location of the mobile phone 1, and the current location is also transmitted to the server as the starting location constituting the route searching condition.

KC11: Guide Execution Point Setting Means

The guide execution point setting means KC11 establishes a guide point situated at a location closest to the current location or the destination location, selected from a number of guide points as the guide execution point at which the user is notified of guide information. In particular, when the user travels carrying the mobile phone 1, the guide execution point setting means KC11 changes or sets the guide execution point as the current location changes.

KC12: Distance Calculating Means

The distance calculating means KC12 calculates the distance between the current location of the mobile phone 1 and a guide execution point based on data pertinent to the position of the current location and the position of the guide execution point.

KC13: Distance Notification Discriminating Means

The distance notification discriminating means KC13 includes a distance notification storing means KC13A, and determines whether the distance between the current location and a guide execution point at which the user is notified of guide information has reached a predetermined distance.

KC13A: Distance Notification Storing Means

The distance notification storing means KC13A stores the predetermined distances (distance notices) at which the user will be notified of guide information when such distances are reached. The distance notification storing means KC13A according to the first embodiment stores information corresponding to 200 m, 100 m, 50 m, 30 m, and 20 m as distance notices. It should be noted that the distance notices may be changed as may be deemed appropriate.

KC14: Guide Information Notifying Means

The guide information notifying means KC14 includes a guide voice reproducing means KC14A and a notifying image display means KC14B, and notifies the user of the guide information (i.e., distance to a guide execution point and the direction in which to turn at the guide execution point) based on the distance between the current location of the mobile phone 1 and a guide execution point.

KC14A: Guide Voice Reproducing Means

The guide voice reproducing means KC14A includes a guide voice storing means KC14A1 which stores guide voices used for notifying the user that the distance between the current location and a guide execution point has reached a predetermined distance, and reproduces the guide voice as guide information if the distance has reached a predetermined distance.

KC14B: Image Notification Display Means

The image notification display means KC14B shows on the information display screen 11 an image notification (distance notifying image) indicating the distance between the current location and a guide execution point and the direction in which to turn at the guide execution point as guide information.

KC15: Current Location/Route Distance Determining Means

The current location/route distance determining means KC15 determines whether the distance between the current location measured by the GPS device and the route leading to the destination location is excessively long, in other words, whether the distance between the current location and the route leading to the destination location is within a predetermined distance. If the distance is excessively long, a display image (not shown) which prompts re-searching of another route (rerouting) is shown to the user.

KC16: Terminal Side Transmitting Means

The terminal side transmitting means KC16 is composed of a searching condition transmitting means KC16A and a map request transmitting means KC16B, and transmits data such as the searching conditions to the route guidance data delivery server 7.

KC16A: Searching Condition Transmitting Means

The searching condition transmitting means KC16A transmits the route searching condition data stored in the searching condition storing means KC2B to the server if the searching condition transmitting icon shown on the searching condition entry image (refer to FIG. 3) is selected.

KC16B: Map Request Transmitting Means

The map request transmitting means KC16B transmits map data transmission requests to transmit map data to the server. The map request transmitting means KC16B according to the first embodiment transmits unit map transmission requests for transmission of unavailable unit map data to the sever 7 if the unit map shortage determining means KC5A has determined that the unit map data is insufficient.

(Description of the Control Section of the Route Guidance Data Delivery Server 7)

Figure 5:
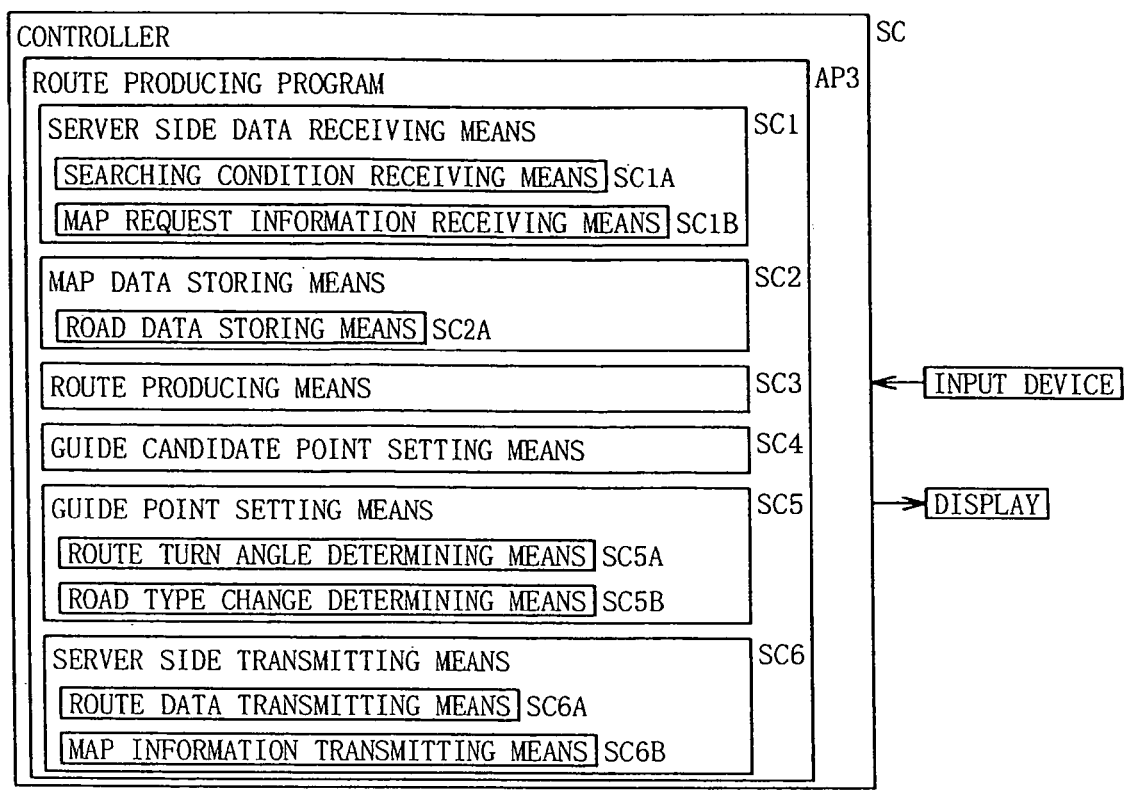
FIG. 5 is a functional block diagram illustrating the functions of a server of the route guidance system of the first embodiment.

FIG. 5 is a functional block diagram illustrating the functions of the server of the route guidance system of the first embodiment.

In FIG. 5, the controller SC of the route guidance data deliver server 7 comprises an I/O (input/output interface) I/O (input/output interface (I/O) which delivers input/output signals from/to the outside and adjusts the levels of input/output signals and the like, a ROM (Read Only Memory, recording medium such as a hard disk) which stores programs, data, and the like for necessary processing, a RAM (Random Access Memory, recording medium) which temporarily stores necessary data, a CPU (Central Processing Unit) which executes processing according to the programs stored in the ROM and the like, and a microcomputer which includes a clock oscillator and executes the programs stored in the ROM and the like to carry out various functions.

(Signal Input Elements Connected to the Controller SC of Server)

The controller SC of the route guidance data delivery server 7 receives signals from input devices such as a keyboard and a mouse, and other signal input elements. The input device detects an input made by a user, and inputs a detected signal into the controller SC.

(Control Elements Connected to the Controller SC of Server)

Moreover, the controller SC of the route guidance data delivery server 7 is connected to a display, a power supply circuit (not shown), and other control elements, and outputs the operation control signals thereof. The display displays images based on the user's input.

(Functions of the Controller SC of Server)

The controller SC of the route guidance data delivery server 7 is provided with a route producing program AP3, which is an application program for route guidance data delivery that processes data respectively transmitted from the navigation software (route guidance program AP1) of the mobile phone 1, other programs, and the like, and has a function (control means) which executes processing according to the output signals generated by the respective signal output elements and the like, thereby outputting the control signals to the respective control elements and the like. The function (control means) of the application program AP3 for the route guidance data delivery of the controller SC will be described hereafter.

SC1: Server Side Data Receiving Means

The server side data receiving means SC1 includes a searching condition receiving means SC1A and a map request'receiving means SC1B, and receives the searching condition data and the like transmitted from the mobile phone 1.

SC1A: Searching Condition Receiving Means

The searching condition receiving means SC1A receives and stores the route searching condition data transmitted from the mobile phone 1.

SC1B: Map Request Receiving Means

The map request receiving means SC1B receives and stores map data transmission requests (unit map transmission requests) transmitted from the mobile phone 1.

Figure 6:
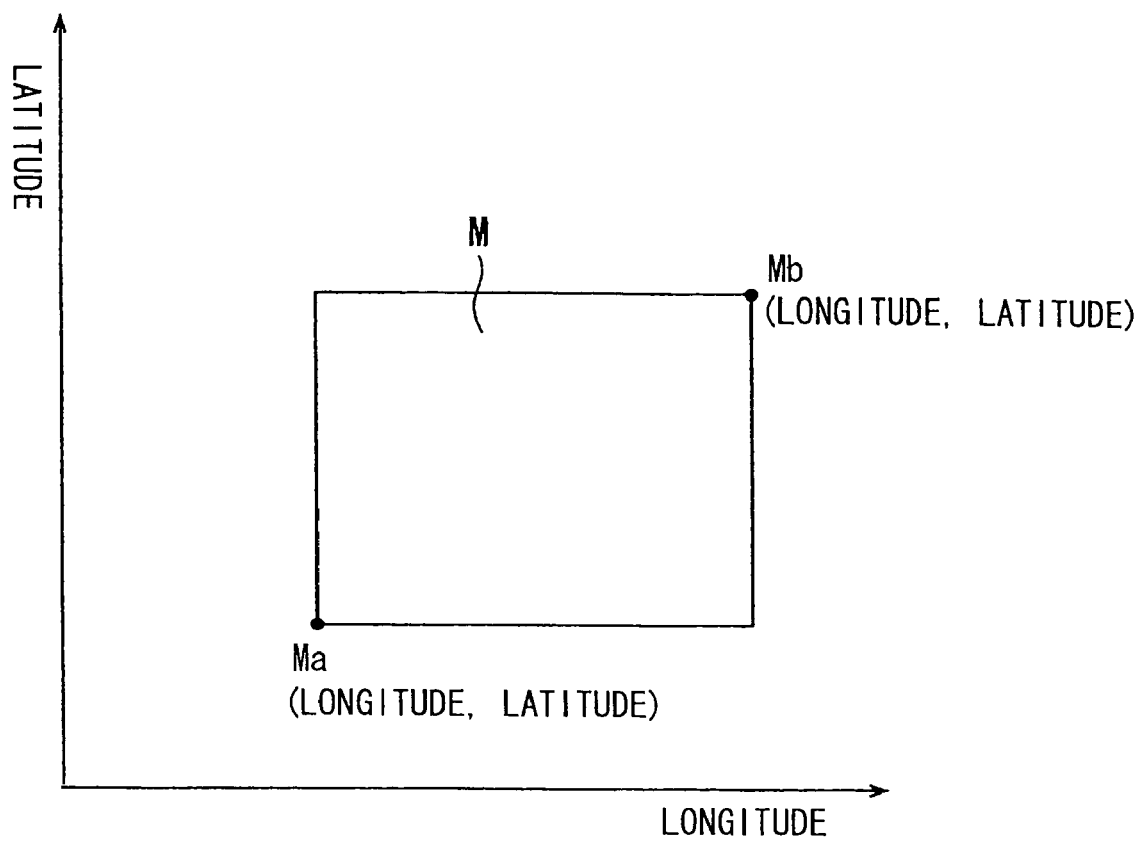
FIG. 6 shows the unit map data as map data according to the first embodiment.

FIG. 6 shows the unit map data as map data according to the first embodiment.

SC2: Map Data Storing Means

The map data storing means SC2 comprises a road data storing means SC2A for storing map data. The map data stored in the map data storing means SC2 according to the first embodiment comprises unit map data of unit maps M of varying predetermined range based on the longitude and latitude as shown in FIG. 6. In particular, the multiple unit maps M contain an indication of their respective ranges defined by two points of corner positions Ma and Mb, as shown in FIG. 6.

Figure 7:
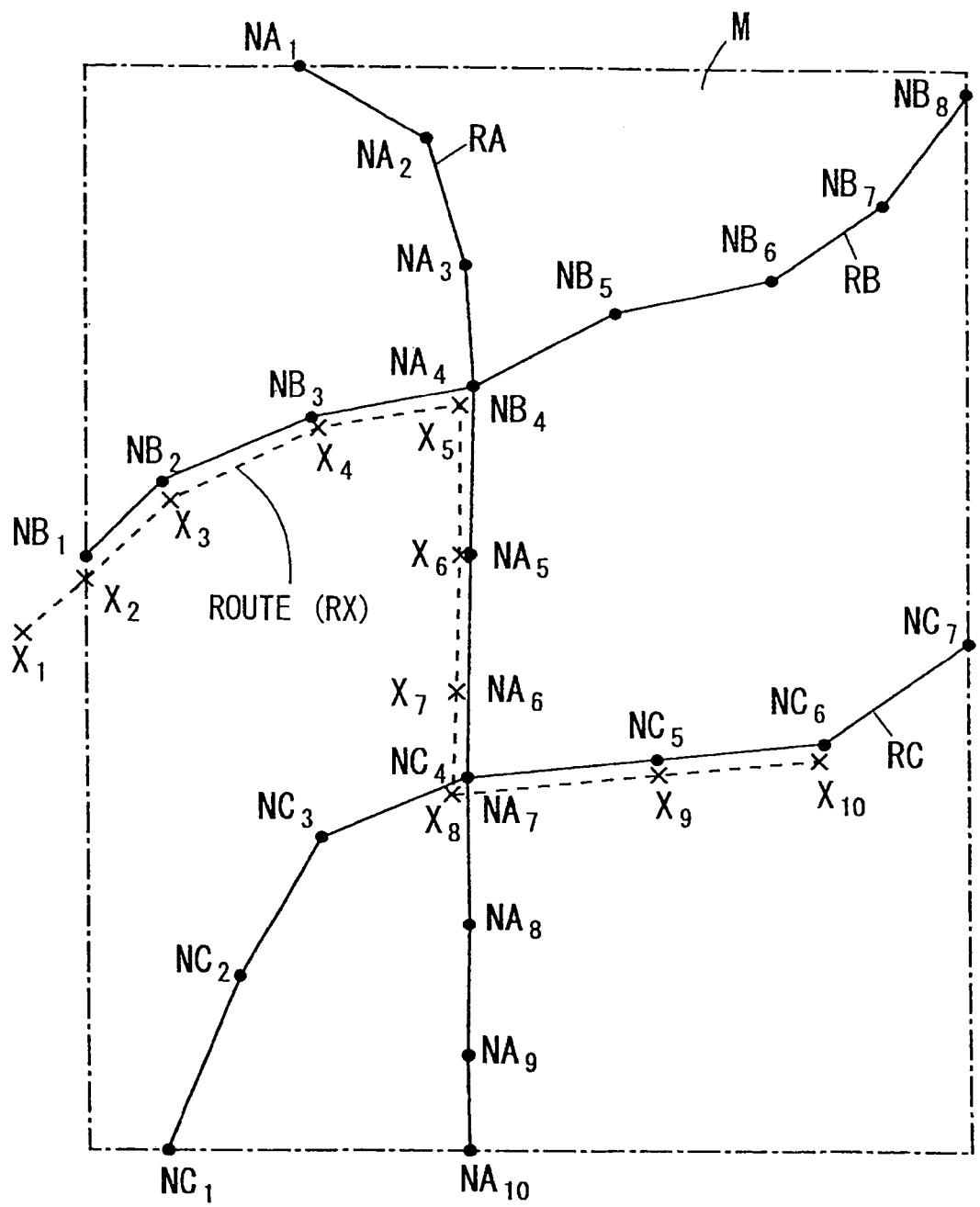
FIG. 7 shows an example of the unit map, and data of roads on the unit map according to the first embodiment.

FIG. 7 shows an example of a unit map, and data of roads on the unit map according to first embodiment.

SC2A: Road Data Storing Means

The road data storing means SC2A stores road data that is formed by connecting multiple lines and curves successively along the center of a road on a map, and includes data pertinent to the location of the point of connection between the lines and curves. In FIG. 7, the road data storing means SC2A stores road data RA, RB, and RC which are approximately represented by polygonal lines formed by connecting lines, and stores data pertaining to the position of vertices (connection points) NA1 to NA10, NB1 to NB8, and NC1 to NC7 of the respective roads RA to RC. The road data storing means SC2A according to the first embodiment then stores road type data (data such as the name of a road ("Central Street", for example), and types of roads such as a trail, national road or expressway) corresponding to the respective roads RA to RC.

SC3: Route Producing Means

The route producing means SC3 determines the route from the starting location to the destination location according to the route searching conditions received, and produces the route data consisting of starting location data which indicates the position of the starting location, destination location data which indicates the position of the destination location, and position data pertaining to guide points which are set in the course of the route and at which the user is notified of guide information. For example, the route producing means SC3 according to the first embodiment determines the route (RX) which includes the starting location X1 (a starting location outside the unit map M) on one end, the destination location X10 on the other end, and is formed by connecting multiple lines and curves successively as shown in FIG. 7. Route data of the route RX is thereby produced (data indicating the route is vector data) including the starting location X1, guide points X5 and X8, and the destination location X10. It should be noted that the route producing means SC3 according to the first embodiment produces the optimal route RX from the starting location to the destination location along the roads RA to RC similar to the technology described in Patent Document 1. Moreover, the guide points X5 and X8 are set by guide point setting means SC5 described later. Further, if the user specifies that transportation facilities are to be used as route searching conditions, an optimal route including transportation facilities is produced. If the number of routes to be searched is specified, multiple routes are produced corresponding to the specified number.

SC4: Guide Point Candidate Setting Means

The guide point candidate setting means SC4 sets guide point candidates represented by the connection points X2 to X9 of the lines and curves constituting the route RX. The guide point candidate setting means SC4 according to the first embodiment sets the connection points NB1 to NB4 (NA4), NA5 to NA7 (NC4), and NC5 to NC6 of the roads RA to RC arranged on the route RX as the guide point candidates X2 to X10.

SC5: Guide Point Setting Means

The guide point setting means SC5 includes route turn angle determining means SC5A and road type change determining means SC5B, and sets the guide pints X5 and X8 from the guide point candidate points X2 to X9 according to predetermined conditions. The guide point setting means SC5 according to the first embodiment sets a guide candidate point as a guide point if the route turn angle (described later) is equal to or less than a predetermined angle, or the road types of the roads RA to RC are different. For example, in FIG. 7, for the specific guide candidate point X5, if the route turn angle $\alpha i$ ($0 \leq \alpha i \leq 180°$) formed by the road RB between the starting location side guide candidate point X4 situated on the starting location X1 side of the specific guide candidate point X5 along the route RX and the specific guide candidate point X5, and the road RA between the destination location side guide candidate point X6 situated on the destination location X10 side of the specific guide candidate point X5 along the route RX and the specific guide candidate point X5 is equal to or less than a predetermined angle $\alpha a$ ($\alpha a=120°$, for example), the specific guide candidate point X5 is set as a guide point. Moreover, if the road RB on the starting location X1 side of the specific guide candidate point X5 and the road RA on the destination location X10 side of the specific guide candidate point X5 are of different types, the specific guide candidate point X5 is set as a guide point. Further, the guide point setting means SC5 according the first embodiment sets the turning directions at the guide points X5 and X8 (such as "right" at X5, "left" at X8, and "diagonally right") based on the route turn angle $\alpha i$.

SC5A: Route Turn Angle Determining Means

The route turn angle determining means SC5A determines for a specific guide candidate point Xi (i=1 to g, where "g" represents a natural number as the value for the destination location) whether the route turn angle $\alpha i$ formed by the road between the starting location side guide candidate point Xi−1 situated on the starting location (X1) side of the specific guide candidate point Xi along the route RX and the specific guide candidate point Xi, and the road between a destination location side guide candidate point Xi+1 situated on the destination location Xg side of the specific guide candidate point Xi along the route RX and the specific guide candidate point Xi, is equal to or less than the predetermined angle $\alpha a$.

SC5B: Road Type Change Determining Means

The road type change determining means SC5B determines whether a particular road RA, RB, or RC on the starting location X0 side of the specific guide candidate point Xi and a particular road RA, RB, or RC on the destination location X10 side thereof are of different types. For example, the road type change determining means SC5B determines whether the road RB on the starting location X1 side of the specific guide candidate point X5 and the road RA on the destination location X10 side thereof are of different types (such as the name of a street).

SC6: Server Side Transmitting Means

The server side transmitting means SC6 includes route data transmitting means SC6A and map information transmitting means SC6B, and transmits the route data and the like from the route guidance data delivery server 7 to the mobile phone 1.

SC6A: Route Data Transmitting Means

The route data transmitting means SC6A transmits the route data produced by the route producing means SC3 to the mobile phone 1.

SC6B: Map Information Transmitting Means

The map information transmitting means SC6B transmits the map data corresponding to the map data transmission request to the mobile terminal. In particular, the map information transmitting means SC6B according to the first embodiment transmits unit map data which is not available in the mobile phone 1.

(Description of the Flowchart)

(Description of the Main Flowchart of the Server)

Figure 8:
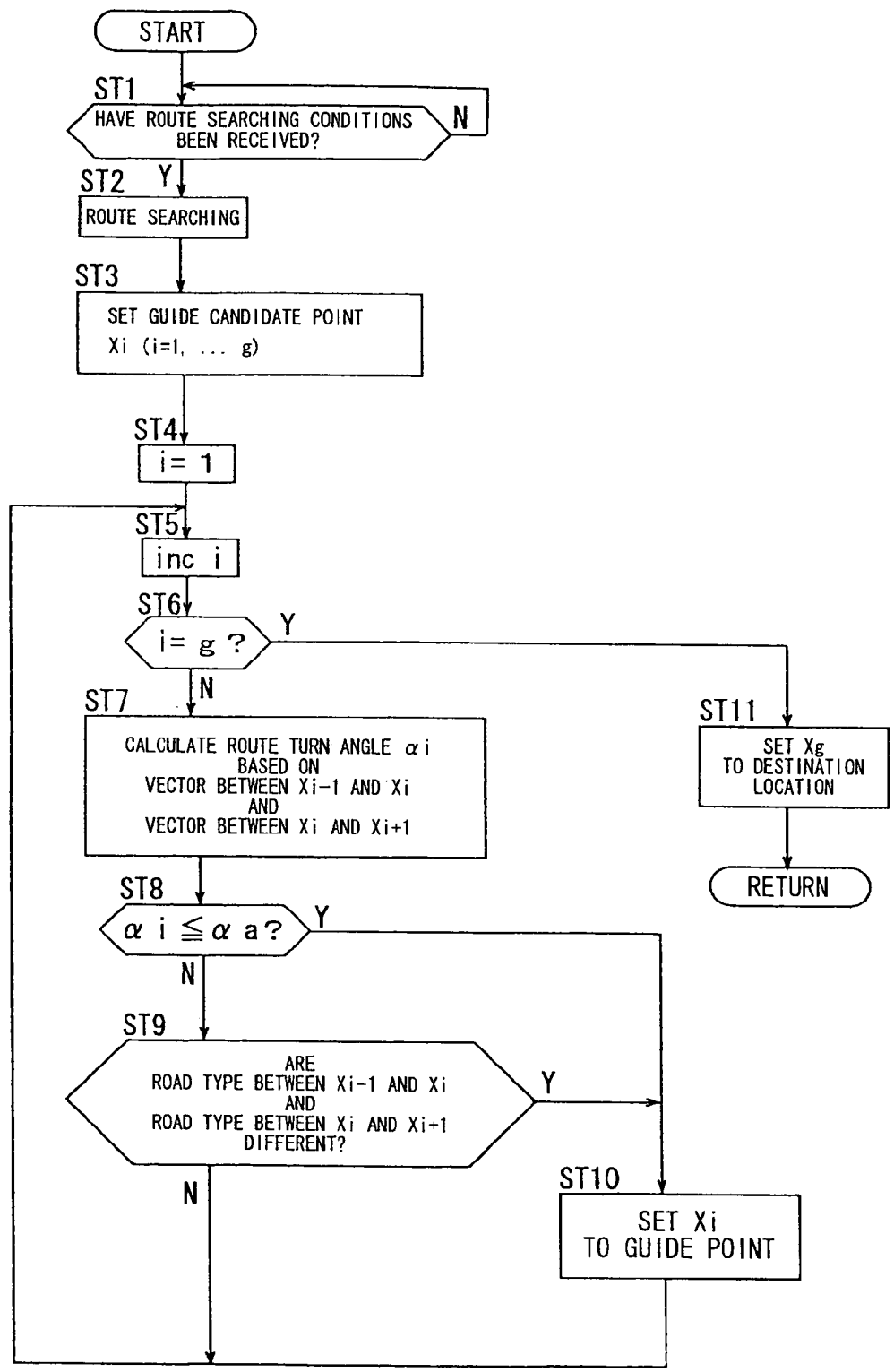
FIG. 8 pertains to the main flowchart of guide route production processing by a route guidance data delivery application program provided for the server of the route guidance system of the first embodiment.

FIG. 8 pertains to the main flowchart of guide route production processing by the route guidance data delivery application program provided for the server of the route guidance system of the first embodiment.

The respective steps (ST's) indicated in the flowchart in FIG. 8 are executed according to the route guidance data delivery application program AP3 stored in the ROM or the like of the controller SC of the server 7. In addition, this processing is executed in parallel with various other types of processing performed by the server 7. A detailed description is not given of unit map data determining/transmitting processing (processing executed in parallel with the guide route producing processing), which determines and transmits unit map data that is not available in the mobile phone 1 according to a request from the mobile phone 1.

The flowchart process shown in FIG. 8 starts when the power supply for the server 7 is turned on.

In step ST1 in FIG. 8, the program determines whether the route searching condition data transmitted from the mobile phone 1 has been received. The program proceeds to step ST2 if "YES" (Y), and repeats step ST1 if "NO" (N).

In step ST2, the program determines the route RX from the starting location X1 to the destination location X10 along the roads RA to RC based on the route searching conditions received. The program then proceeds to step ST3.

In step ST3, Xi (i=1 to g (where g is the maximum value indicating the destination location, g=10 in FIG. 7)) are sequentially assigned to guide point candidates (including the starting location and destination location) in the traveling direction (from the starting location X1 to the destination location X10) on the determined route RX. The program then proceeds to step ST4.

In step ST4, the "i" of the guide candidate point Xi is set to 1 to determine whether the guide point candidate is a guide point or not. Namely, Xi is set to X1 (starting location). The program then proceeds to step ST5.

In step ST5, i is incremented by 1. Namely, i is set to i+1. The program then proceeds to step ST6.

In step ST6, the program determines whether i=g. Namely, the program determines whether the guide point candidate is the destination location. The program proceeds to step ST7 if "NO" (N), and proceeds to step ST11 if "YES" (Y).

In step ST7, the program calculates the angle formed by a vector between the guide candidate point Xi−1 on the starting location side of the guide candidate point Xi and Xi, and a vector between the guide candidate point Xi+1 on the destination location side and Xi. Namely, the route turn angle αi, which is the angle formed by the road between the guide point candidates Xi−1 and Xi and the road between the guide point candidates Xi+1 and Xi, is calculated. The program then proceeds to step ST8.

In step ST8, the program determines whether the route turn angle αi is equal to or less than the predetermined angle αa. The program proceeds to step ST9 if "NO" (N), and proceeds to step ST10 if "YES" (Y).

In step ST9, the program determines whether the type (name of road and the like) of road between the guide candidate point Xi−1 on the starting location side of the guide candidate point Xi and Xi, and the type of road between the guide candidate point Xi+1 on the destination location side and Xi are different. The program proceeds to step ST10 if "YES" (Y), and returns to step ST5 without setting the guide candidate point Xi as the guide point if "NO" (N).

In step ST10, the guide candidate point Xi is set as a guide point. The name of an intersection, the distance from a previous guide point, the direction in which to turn, the total distance from the starting location, and the longitude and latitude of the guide point (namely position data) are added to the data pertaining to the set guide point, and the set guide point data is then transmitted to the mobile phone 1, and used to create the display image and the voice guide for notifying the user of the guide information. The program then returns to step ST5.

In step S11, since "i" corresponds to "g", Xg is set as the destination location, and the program returns to step ST1.

(Description of the Main Flowchart of the Mobile Terminal)

Figure 9:
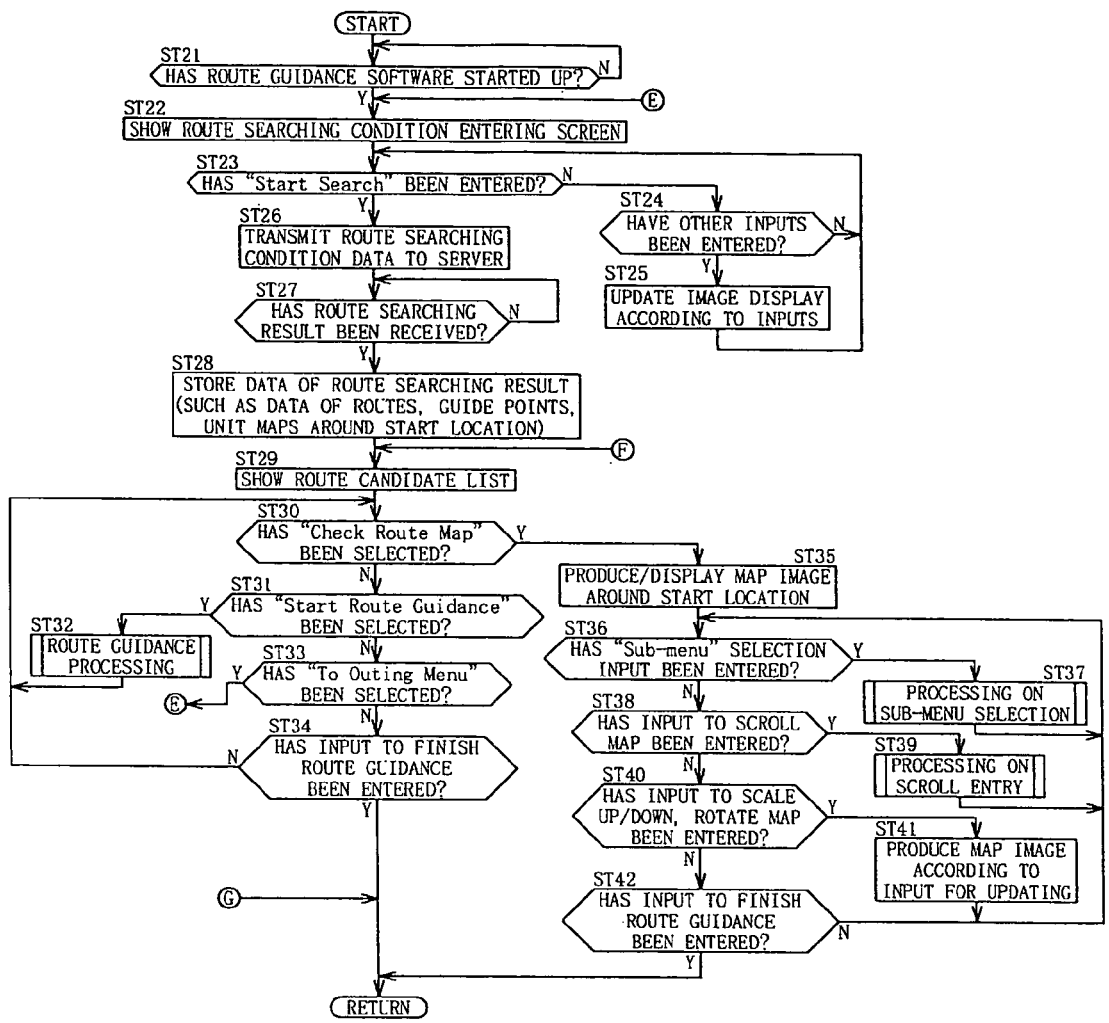
FIG. 9 pertains to the main flowchart of a route guidance program provided for the mobile terminal of the route guidance system of the first embodiment.

FIG. 9 pertains to the main flowchart of the route guidance program provided for the mobile terminal of the route guidance system of the first embodiment.

The respective steps (ST's) indicated in the flowchart in FIG. 9 are executed according to the route guidance program AP1 stored in the ROM or the like of the controller KC. Moreover, this processing is executed in parallel with various types of processing of the mobile phone 1.

The flowchart process shown in FIG. 9 starts when the power supply for the mobile phone 1 is turned on.

In step ST21 in FIG. 9, the program determines whether the route guidance program AP1 is started up. The program proceeds to step ST22 if "YES" (Y), and repeats step ST21 if "NO" (N).

In step ST22, the route searching condition entry image (refer to FIG. 3) is shown on the information display screen 11. The program then proceeds to step ST23.

In step ST23, the program determines whether the searching condition transmitting icon labeled "Start Search" on the route searching condition entry image is selected based on the user's input. The program proceeds to step ST24 if "NO" (N), and proceeds to step ST26 if "YES" (Y).

In step ST24, the program determines whether there have been other entries, namely, entries pertaining to respective entry fields (such as destination location) on the route searching condition entry image shown in FIG. 3. The program proceeds to step ST25 if "ES" (Y), and returns to step ST23 if "NO" (N).

In step ST25, the route searching condition entry image shown in FIG. 3 is updated based on the user's input in step ST24. The program then returns to step ST23.

In step ST26, the route searching condition data entered by the user is transmitted to the route guidance data delivery server 7. The program then proceeds to step ST27.

In step ST27, the program determines whether the route data obtained as a result of route searching has been received. The program proceeds to step ST28 if "YES" Y), and repeats step ST27 if "NO" (N).

In step ST28, the route data (pertaining to the route, the respective positions of the guide points, and the respective positions of the starting location and the destination location) obtained as a result of route searching and unit map data in the vicinity of the starting location are received and stored. The program then proceeds to step ST29.

Figure 10:
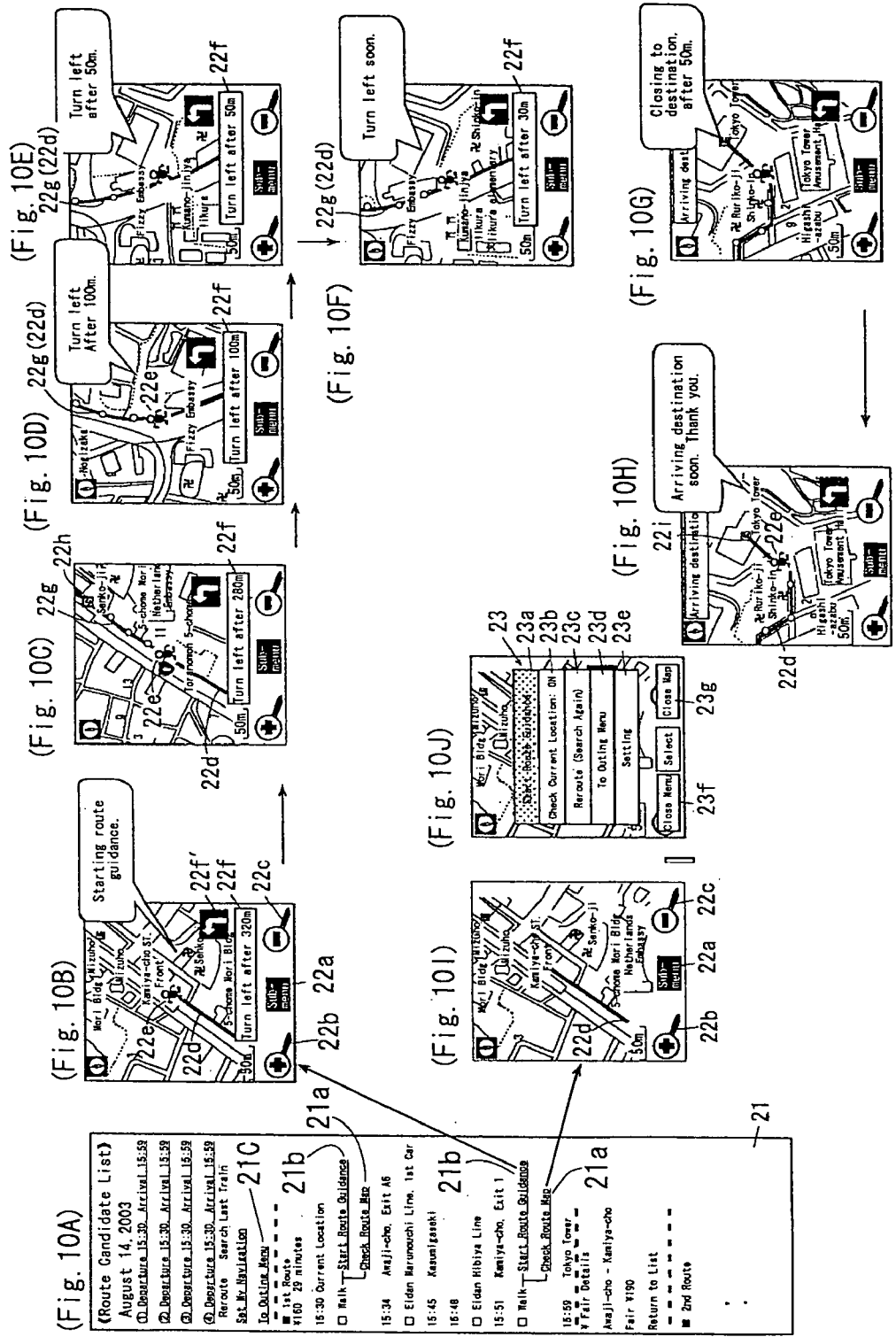

FIGS. 10A to 10J illustrate images displayed on the information display screen of the mobile terminal of the first embodiment while a particular route guidance is taking place, in which: FIG. 10A illustrates a route candidate list image of the received route candidates, FIG. 10B illustrates a route guidance image and a guide voice respectively shown and reproduced at the start of the route guidance, FIG. 10C illustrates the route guidance image shown during the route guidance, FIG. 10D illustrates a route guidance image and a reproduced guide voice when the distance to a guide point has reached 100 m, FIG. 10E illustrates a route guidance image and a reproduced guide voice when the distance to the guide point has reached 50 m, FIG. 10F illustrates a route guidance image and a reproduced guide voice in the vicinity of the guide point, FIG. 10G illustrates a route guidance image and a reproduced guide voice when the distance to a destination location has reached 50 m, FIG. 10H illustrates a route guidance image and a reproduced guide voice in the vicinity of the destination location, FIG. 10I illustrates a displayed map image shown if a particular route guidance map is selected, and FIG. 10J illustrates a displayed sub-menu image shown if a particular sub menu is selected.

A portion of the route candidate list image 21 illustrated in FIG. 10A, which can be shown on the information display screen 11, based on the route data received, is indicated in step ST29 of FIG. 9. It should be noted that second and subsequent routes are not shown in the route candidate list image 21 shown in FIG. 10A. The program then proceeds to step ST30.

In step ST30, the program determines whether an icon image 21a labeled "Check Route Map" has been selected in the route candidate list image 21 in FIG. 10A. The program proceeds to step ST31 if "NO" (N), and proceeds to step ST35 if "YES" (Y).

In step ST31, the program determines whether an icon image 21b labeled "Start Route Guidance" has been selected in the route candidate list image 21 in FIG. 10A. The program proceeds to step ST32 if "YES" (Y), and proceeds to step ST33 if "NO" (N).

In step ST32, route guidance processing including route guidance (refer to the subroutines shown in FIGS. 11 and 12, and described later) is executed, and the program returns to step ST30.

In step ST33, the program determines whether an icon image 21c labeled "To Outing Menu" (reentry of route searching conditions) has been selected in the route candidate list image 21 in FIG. 10A. The program returns to step ST22 if "YES" (Y), and proceeds to step ST34 if "NO" (N).

In step ST34, the program determines whether there has been an input to terminate the route guidance software. The program returns to step ST30 if "NO" (N), and returns to step ST21 if "YES" (Y).

In step ST35, a map image is produced within the vicinity of the starting location and displayed as illustrated in FIG. 10I. The program then proceeds to step ST36.

In step ST36, the program determines whether a sub-menu icon 22a is selected on the map image shown in FIG. 10I. The program proceeds to step ST37 if "YES" (Y), and proceeds to step ST38 if "NO" (N).

In step ST37, the program conducts sub-menu selection processing (refer to the subroutine in FIG. 13, described later), which shows an image of the sub-menu (refer to FIG. 10J), and whether the guidance is carried out by means of a guide voice, and the like based on the user's input is determined. The program then returns to step ST36.

In step ST38, the program determines whether an entry to scroll the displayed map image (entry by means of up, down, left, and right arrow keys on the mobile phone 1, for example) has been made. The program proceeds to step ST39 if "YES" (Y), and proceeds to step ST40 if "NO" (N).

In step ST39, the program executes scroll entry processing (refer to the subroutine in FIG. 14, described later). The program then returns to step ST36.

In step ST40, the program determines whether a map scaling-up icon image 22b or a map scaling-down icon image 22c on the map image has been selected, or whether an entry to rotate the map image (to select the entry to rotate the map image clockwise, depress the "#" key, and to rotate the map image counterclockwise by depress the "*" key, for example) shown in FIG. 10I has been made. The program proceeds to step ST41 if "YES" (Y), and proceeds to step ST42 if "NO" (N).

In step ST41, a map image is produced according to the entry selected, i.e., scaling up/down or rotation, and the display image is updated on the information display screen 11. The program then returns to step ST36.

In step ST42, the program determines whether there has been an entry to terminate the route guidance. The program returns to step ST36 if "NO" (N), and returns to step ST21 if "ES" (Y).

(Description of the Flowchart of Route Guidance Processing (Subroutine in Step ST32))

Figure 11:
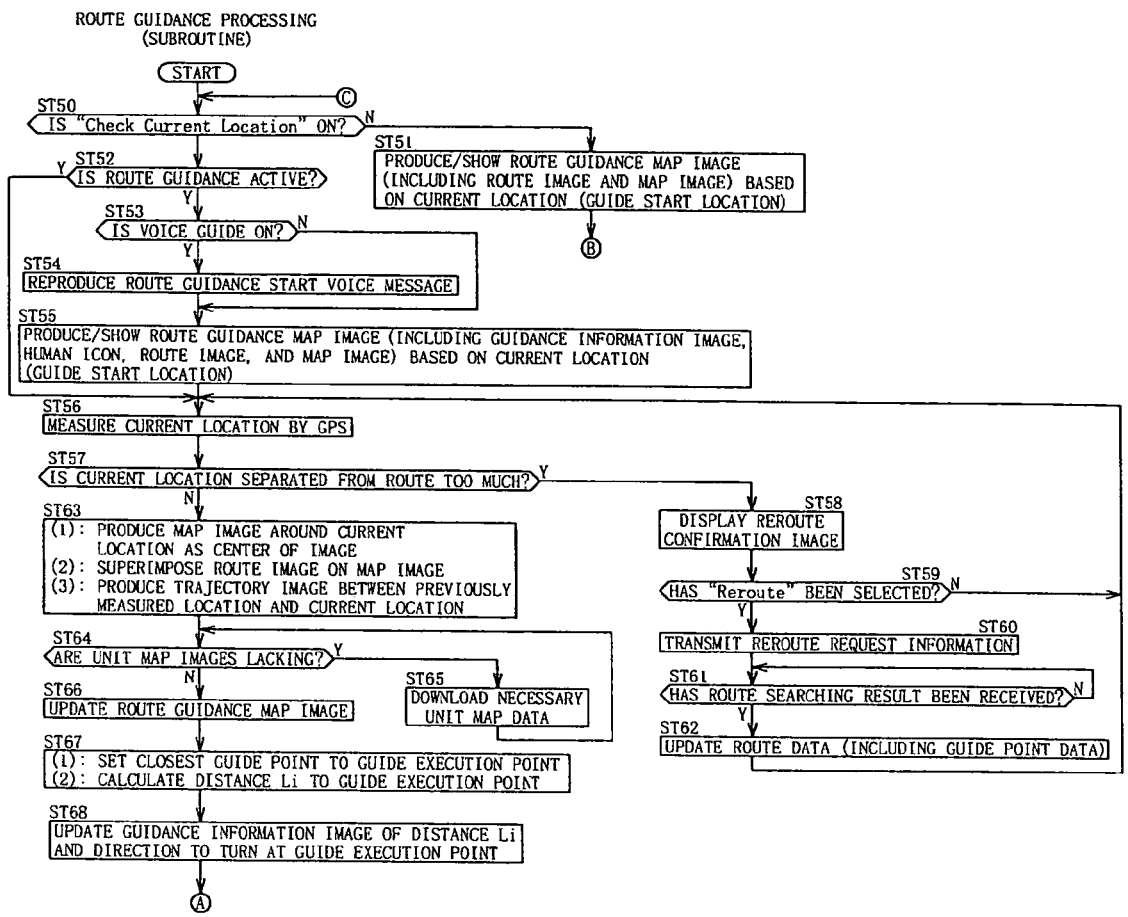
FIG. 11 pertains to the flowchart of route guidance processing of the mobile terminal of the first embodiment, and corresponds to a subroutine marked as step ST32 in FIG. 9.

FIG. 11 pertains to the flowchart of route guidance processing of the mobile terminal of the first embodiment, and corresponds to the subroutine marked as step ST32 in FIG. 9.

Figure 12:
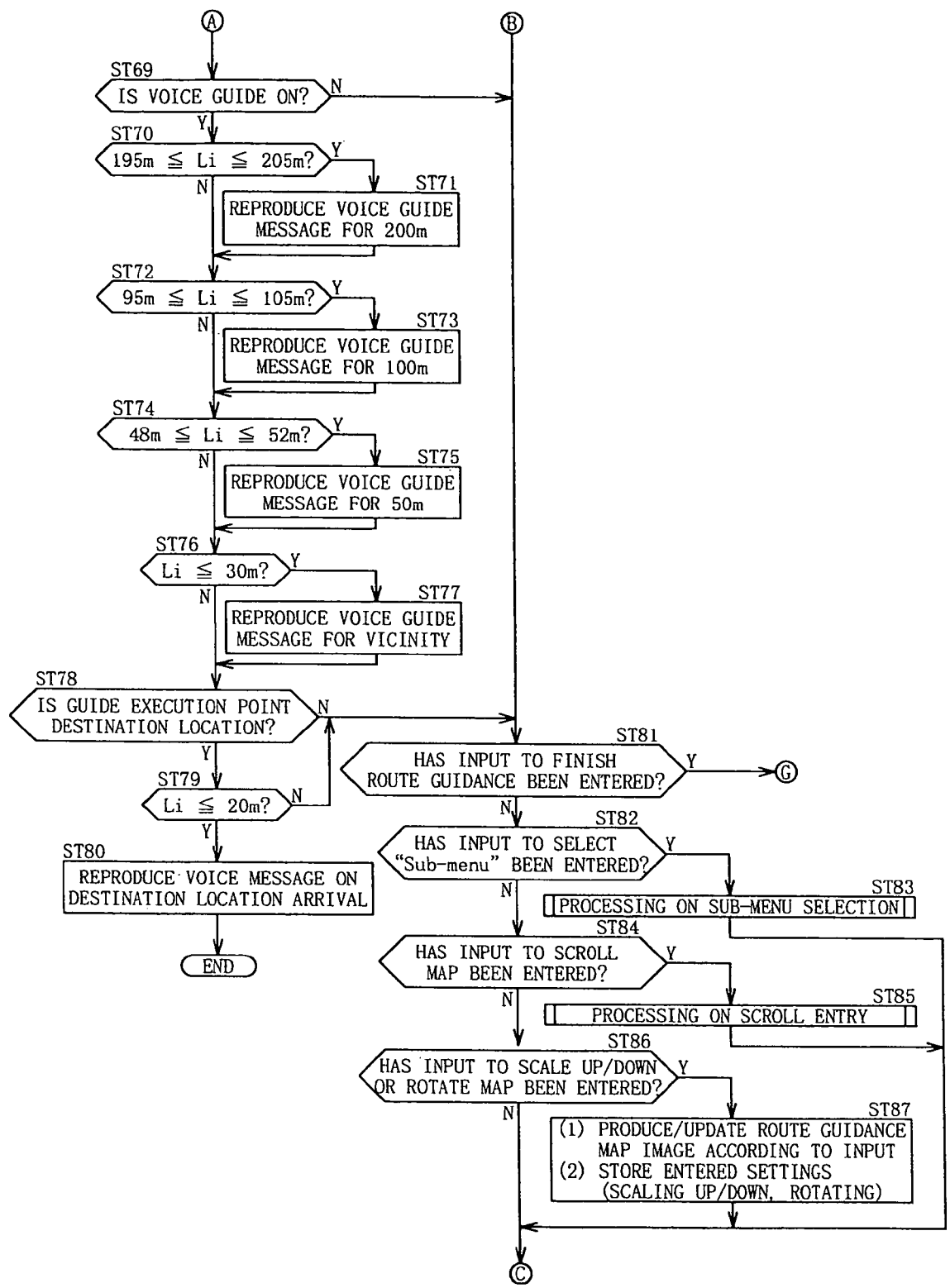
FIG. 12 pertains to the flowchart of the continued route guidance processing referred to in FIG. 11 as conducted by the mobile terminal of the first embodiment.

FIG. 12 pertains to the flowchart of the continued route guidance processing referred to in FIG. 11 as conducted by the mobile terminal of the first embodiment.

In step ST50 in FIG. 11, the program determines whether automatic scrolling of the route guidance image is taking place as the mobile phone 1 moves and notification of guide information (confirmation of the current location) are simultaneously set to on. The program proceeds to step ST51 if "NO" (N), and proceeds to step ST52 if "YES" (Y).

In step ST51, a route guidance map image within the vicinity of the current location is produced and shown. It should be noted that the route guidance image is produced by combining the map image and the route image 22d, as shown in FIG. 10I, and the user manually scrolls the map image. The program then proceeds to step ST81 in FIG. 12.

In step ST52, the program determines whether route guidance is being carried out, namely whether the route guidance should begin or not. The program proceeds to step ST56 if "YES" (Y) (during the route guidance), and proceeds to step ST53 if "NO" (N) (route guidance to be started).

In step ST53, the program determines whether voice guidance is set to on. The program proceeds to step ST54 if "YES" (Y), and proceeds to step ST55 if "NO" (N).

In step ST54, a route guidance start voice message (voice message "Starting Route Guidance" shown in FIG. 10B) is reproduced, and the user is notified accordingly. The program then proceeds to step ST55.

In step ST55, a route guidance map image within the vicinity of the starting location (guide starting location) (refer to FIG. 10B) is produced and displayed. It should be noted that in step ST55, the route guidance map image produced by combining the map image and the route image 22d, and by further combining a human icon image 22e representing the current location (starting location), a distance notifying image 22f indicating the distance to the next guide point, and a direction in which to turn at the next guide point, and a turning direction image (notifying image) 22f' representing the direction in which to turn at the next guide point is illustrated as an arrow in FIG. 10B. The program then proceeds to step ST56.

In step ST56, the current location of the mobile phone 1 is measured by means of the GPS. The program then proceeds to step ST57.

In step ST57, the program determines whether the current location is too far from the route. The program proceeds to step ST58 if "YES" (Y), and proceeds to step ST63 if "NO" (N).

In step ST58, a reroute confirming image (not shown) prompting the user to search another route is shown. The program then proceeds to step ST59.

In step ST59, the program determines whether there has been an entry to search another route. The program proceeds to step ST60 if "YES" (Y), and returns to step ST56 if "NO" (N).

In step ST60, a reroute search request (route searching condition data) is transmitted to the server 7. The program then proceeds to step ST61.

In step ST61, the program determines whether the results of route searching (route data) have been received. The program proceeds to step ST62 if "YES" (Y), and repeats step ST61 if "NO" (N).

In step ST62, the route data (including data pertaining to the position of the guide points) is updated. The program then returns to step ST56.

In step ST63, the following processing steps (1) to (3) are executed, and the route guidance program proceeds to step ST64.
  (1) A map image is produced such that the current location measured by means of the GPS is arranged at the center of the image display screen 11.
  (2) A route guidance map image is produced by producing a route image 22*d* corresponding to the current location, and then superimposing the route image 22*d* on the map image.
  (3) A trajectory image 22*g* (refer to FIG. 10C) is produced between a previous location measured by means of the GPS (previously measured location) and the current location. It should be noted that a starting location image 22*h* indicating the starting location is similar to the starting location shown in FIG. 10C.

In step ST64, the program determines whether the required unit map images to produce the map image referred to in step ST63 are available. The program proceeds to step ST65 if "YES" (Y), and proceeds to step ST66 if "NO" (N).

In step 65, a request for the transmission of unavailable necessary unit map data is made to the server 7, and such unit map data is received (downloaded). The program then returns to step ST63.

In step ST66, the route guidance map image produced in step ST63 is shown, thereby updating the display image on the information display screen 11. The program then proceeds to step ST67.

In step ST67, the following processing steps (1) and (2) are executed, and the route guidance program proceeds to step ST68.
  (1) A guide point (or destination location) closest to the current location along the route is set as a guide execution point. Namely, a guide point Xi, which has the smallest i (i=5, 8, or 10), of the guide points X5, X8, or the destination X10 on the destination X10 side of the current location along the route, or the like is set as the guide execution point.
  (2) The distance Li between the current location and the guide execution point is calculated.

In step ST68, the distance Li and the distance notifying image 22*f*, which indicates the direction in which to turn at the guide execution point are updated. The program then proceeds to step ST69.

In step 69 in FIG. 12, the program determines whether the execution of the voice guide is set to on or not. The program proceeds to step ST70 if "YES" (Y), and proceeds to step ST81 if "NO" (N).

In step ST70, the program determines whether the distance Li ranges from 195 m to 205 m, in particular, whether the distance between the current location to the guide execution point is approximately 200 m. The program proceeds to step ST71 if "YES" (Y), and proceeds to step ST72 if "NO" (N).

In step ST71, a voice guide message for 200 m is reproduced, notifying the user that the distance to the guide execution point is 200 m, and a direction in which to turn at the guide execution point. The program then proceeds to step ST72.

In step ST72, the program determines whether the distance Li ranges from 95 m to 105 m, in particular, whether the distance between the current location and the guide execution point is approximately 100 m. The program proceeds to step ST73 if "YES" (Y), and proceeds to step ST74 if "NO" (N).

In step ST73, as shown in FIG. 10D, a voice guide message for 100 m is reproduced, notifying the user that the distance to the guide execution point is 100 m, and the direction in which to turn at the guide execution point (voice message "Turn left after 100 m" as shown in FIG. 10D). The program then proceeds to step ST74.

In step ST74, the program determines whether the distance Li is 48 m to 52 m, in particular, whether the distance between the current location to the guide execution point is approximately 50 m. The program proceeds to step ST75 if "YES" (Y), and proceeds to step ST76 if "NO" (N).

In step ST75, as shown in FIG. 10E or 10G, a voice guide message for 50 m is reproduced, notifying the user that the distance to the guide execution point is 50 m, and the direction in which to turn at the guide execution point (voice message "Turn left after 50 m" as shown in FIG. 10E). The program then proceeds to step ST76.

In step ST76, the program determines whether the distance Li is equal to or less than 30 m or not, in particular, whether the current location is close to the guide execution point. The program proceeds to step ST77 if "YES" (Y), and proceeds to step ST78 if "NO" (N).

In step ST77, as shown in FIG. 10F, a voice guide message is delivered notifying the user that the guide execution point will be reached soon, and the direction in which to turn at the guide execution point (voice message "Turn left soon" as shown in FIG. 10F). The program then proceeds to step ST78.

In step ST78, the program determines whether the set guide execution point Xi is the destination Xg. The program proceeds to step ST79 if "YES" (Y), and proceeds to step ST81 if "NO" (N).

In step ST79, the program determines whether the distance Li is equal to or less than 20 m or not, in particular, whether the destination location has been reached. The program proceeds to step ST80 if "YES" (Y), and proceeds to step ST81 if "NO" (N).

In step ST80, a voice guide message is delivered notifying the user of his arrival at the destination location (voice message "Arriving at the destination soon, thank you" as shown in FIG. 10H). It should be noted that a destination location image 22*i* indicating the destination location is shown on the route guidance map image in FIG. 10H. Thus, the subroutine of route guidance processing referred to in FIGS. 11 and 12 terminates, and the program returns to step ST32 (or a step ST100 described later) in FIG. 9.

In step ST81, the program determines whether an input to terminate the route guidance has been made. The program proceeds to step ST82 if "NO" (N), and finishes the subroutine of route guidance processing referred to in FIGS. 11 and 12, and returns to step ST21 in FIG. 9 if "YES" (Y).

In step ST82, the program determines whether the sub-menu icon 22*a* has been selected on the map image shown in FIGS. 10B to 10H. The program proceeds to step ST83 if "YES" (Y), and proceeds to step ST84 if "NO" (N).

In step ST83, the route guidance taking place is suspended, and sub-menu selection processing (refer to the subroutine in FIG. 13, described later) which displays the image of the sub-menu, establishes whether the guidance is provided by means of a guide voice and the like based on the user's input, ensues. After the processing on sub-menu selection terminates, the program returns to step ST50, and route guidance processing resumes.

In step ST84, the program determines whether an input to scroll the displayed map image (an input by means of the up, down, left, and right arrow keys on the mobile phone 1, for example) has been made. The program proceeds to step ST85 if "YES" (Y), and proceeds to step ST86 if "NO" (N).

In step ST85, the route guidance processing taking place is suspended, and scroll entry processing ensues (refer to the subroutine in FIG. 14 described later). After the scroll entry processing terminates, the program returns to step ST50, and route guidance processing resumes.

In step ST86, the program determines whether the map scaling up icon image 22*b* or the map scaling down icon image 22*c* has been selected on the route guidance map image shown in FIGS. 10B to 10H, or whether there an input to rotate the route guidance map image has been made. The program proceeds to step ST87 if "YES" (Y), and returns to step ST50 if "NO" (N).

In step ST87, the following processing steps (1) to (2) are executed, and the program returns to step ST50.
 (1) A route guidance map image is produced according to the selected scaling up/down or rotation, and the display image is updated on the information display screen 11.
 (2) The entered setting (scaling up/down and rotation) and the like are stored. Namely, the setting of the scale of route guidance map image to be produced later, and the direction (such as north, south, east, and west) in which it will be set on the top of the information display screen 11 is stored.

Description of the Flowchart of Processing on Sub-Menu Selection (Subroutine in Steps ST37 and ST83))

Figure 13:
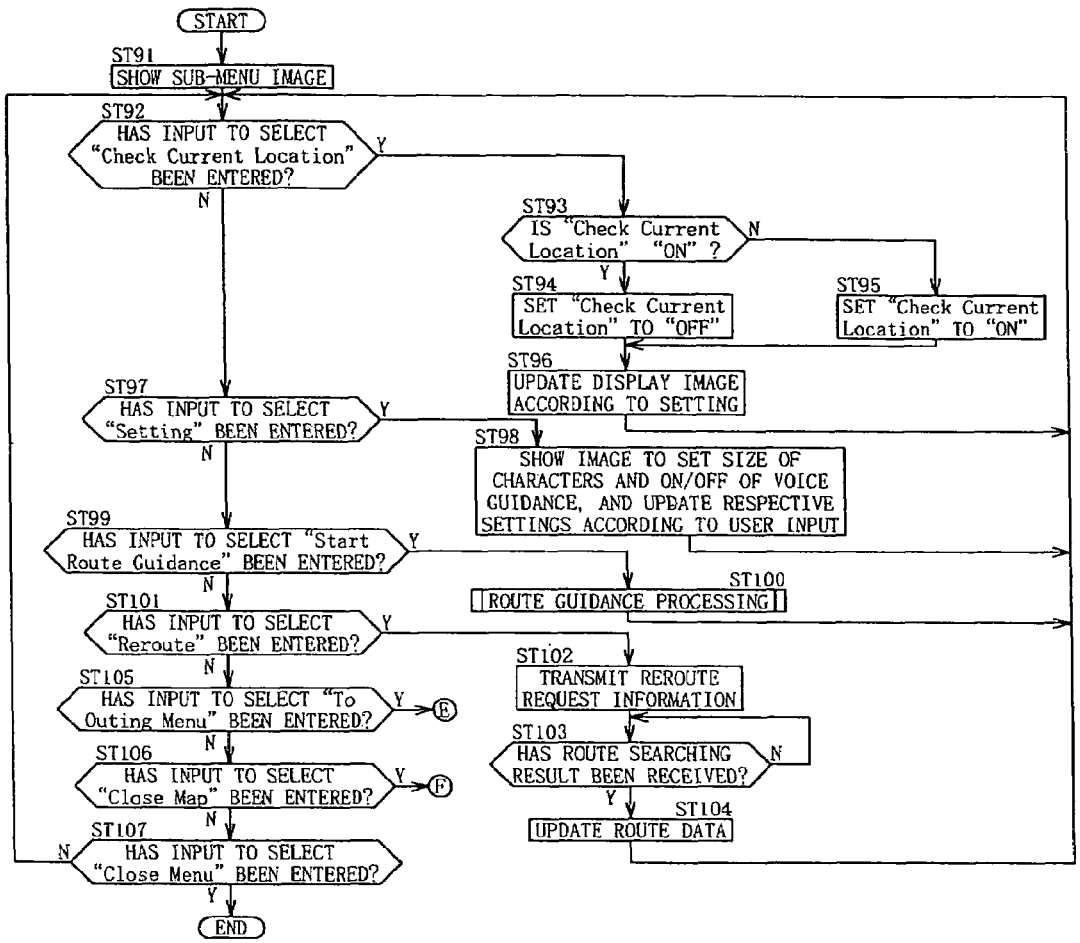
FIG. 13 pertains to the flowchart of processing conducted by the mobile terminal according to the first embodiment upon selection of the sub-menu corresponding to a subroutine marked as step ST37 in FIG. 9 and a subroutine marked as step ST83 in FIG. 12.

FIG. 13 pertains to the flowchart of the processing conducted by the mobile terminal according to the first embodiment upon scroll selection corresponding to the subroutine marked as step ST37 in FIG. 9 and the subroutine marked as step ST83 in FIG. 12.

In step ST91 in FIG. 13, the sub-menu image 23 shown in FIG. 10J is superimposed on the route guidance map image. It should be noted that the sub-menu image 23 includes a guidance start specifying image 23*a* used to commence the route guidance, a current location confirmation setting image 23*b* used to change the setting to confirm the current location, a reroute specifying image 23*c* used to specify execution of rerouting, a searching condition re-specifying image 23*d* representing the image used to enter the route searching conditions, and a guide setting switching image 23*e* used to switch the display to a setting image to turn the voice guide on/off, and the font, size, and the like of character images which are displayed. Moreover, on this occasion, in place of the sub-menu icon image 22*a*, the map scaling up icon image 22*b*, and the map scaling down icon image 22*c*, a sub-menu closing selecting image 23*f* that may be selected to close the sub-menu, a map closing image 23*g* that may be selected to close the sub-menu image 23 and the route guidance map image being shown, and the like are displayed. The program then proceeds to step ST92.

In step ST92, the program determines whether an input to select the current location confirmation setting image 23*b* labeled "Check Current Location" on the sub-menu image 23 in FIG. 10J has been made. The program proceeds to step ST93 if "YES" (Y), and proceeds to step ST97 if "NO" (N).

In step ST93, the program determines whether the current setting of "Check Current Location" is "ON", namely, whether an input has been made to change the setting of the current location confirmation while the current location confirmation is set to "ON". The program proceeds to step ST94 if "YES" (Y), and proceeds to step ST95 if "NO" (N).

In step ST94, the setting of the current location confirmation is changed to "OFF". The program then proceeds to step ST96.

In step ST95, the setting of the current location confirmation is changed to "ON". The program then proceeds to step ST96.

In step ST96, the display image 23*a* is updated according to the setting after the change. The program then returns to step ST92.

In step ST97, the program determines whether an input has been made to select the guide setting switching image 23*e* labeled "Setting" on the sub-menu image 23 in FIG. 10J. The program proceeds to step ST98 if "YES" (Y), and proceeds to step ST99 if "NO" (N).

In step ST98, an image (not shown) for setting the size of the displayed character images and the type of font, and the on/off of the voice guide is shown on the information display screen 11 to update the respective settings according to the user's inputs. The program then returns to step ST92.

In step ST99, the program determines whether an input has been made to select the guidance start specifying image 23*a* labeled "Start Route Guidance" on the sub-menu image 23 in FIG. 10J. The program proceeds to step ST100 if "YES" (Y), and proceeds to step ST101 if "NO" (N).

In step ST100, route guidance processing (refer to the above-described subroutine shown in FIGS. 11 and 12) is similarly carried out as in step ST32, and the program returns to step ST92.

In step ST101, the program determines whether an input has been made to select the reroute specifying image 23*c* labeled "Reroute" on the sub-menu image 23 in FIG. 10J. The program proceeds to step ST102 if "YES" (Y), and proceeds to step ST105 if "NO" (N).

In steps ST102 to ST104, processing similar to those mentioned in steps ST60 to ST62 is carried out, and the program returns to step ST92.

In step ST105, the program determines whether an input has been made to select the searching condition re-specifying image 23*d* labeled "To Outing Menu" on the sub-menu image 23 in FIG. 10J. The program proceeds to step ST106 if "NO" (N), and proceeds to step ST22 in FIG. 9 if "YES" (Y).

In step ST106, the program determines whether an input has been made to select the map closing image 23*g* shown in FIG. 10J. The program proceeds to step ST107 if "NO" (N), and completes the sub-menu selection processing, closes the sub-menu image 23, and proceeds to step ST29 in FIG. 9 if "YES" (Y).

In step ST107, the program determines whether an input has been made to select the sub-menu closing selecting image 23*f* shown in FIG. 10J. The program proceeds to step ST92 if "NO" (N), and closes the sub-menu image 23, completes the sub-menu selection processing, and returns to step ST37 or ST83 if "YES" (Y).

(Description of the Flowchart of Scroll Selection Processing (Subroutine in Steps ST39 and ST85))

Figure 14:
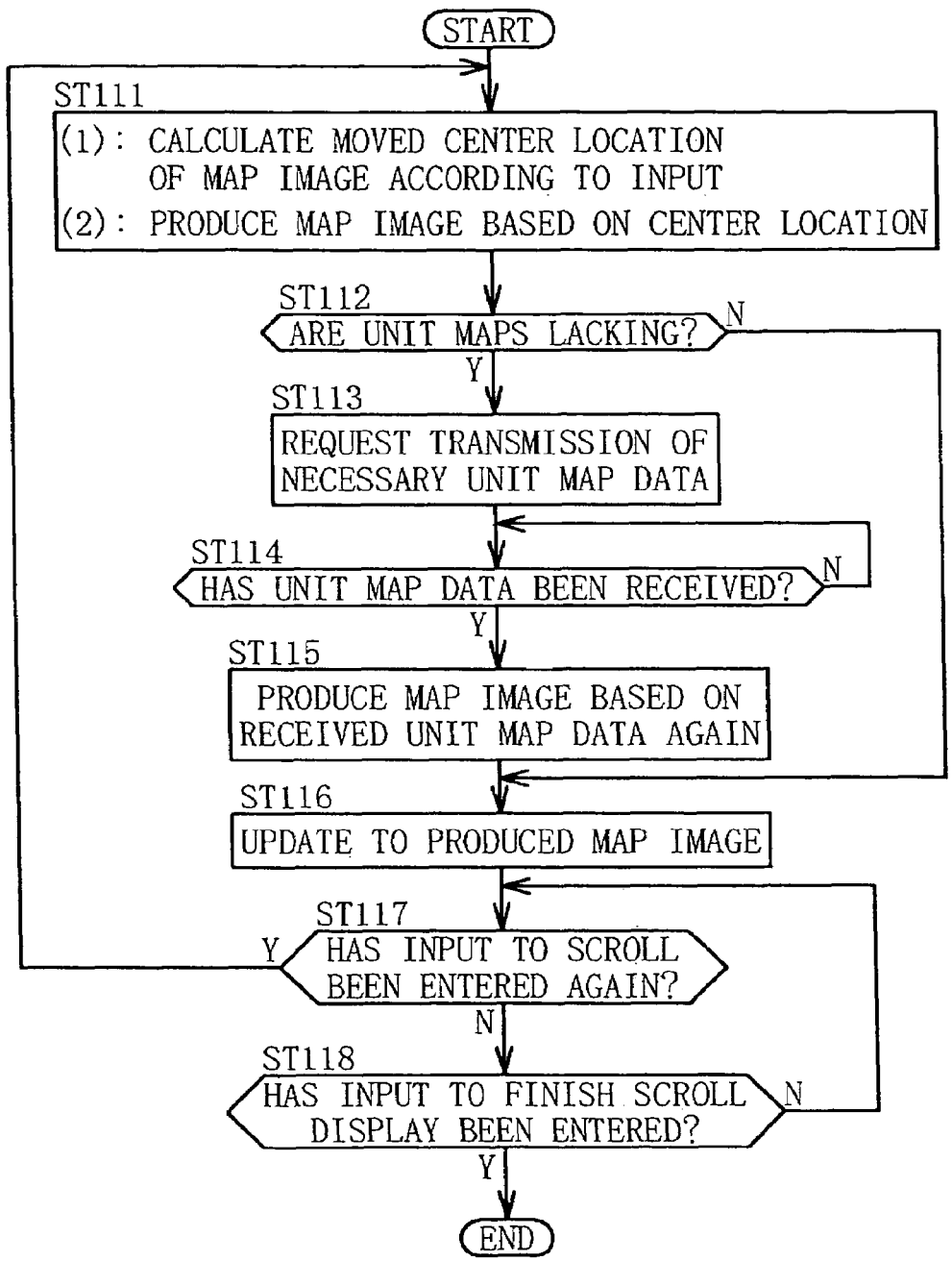
FIG. 14 pertains to the flowchart of processing conducted by the mobile terminal according to the first embodiment upon scroll selection corresponding to a subroutine marked as step ST39 in FIG. 9 and a subroutine conducted by the mobile terminal according to the first embodiment upon step ST85 in FIG. 12.

FIG. 14 pertains to the flowchart of processing conducted by the mobile terminal of the first embodiment upon scroll selection corresponding to the subroutine marked as step ST39 in FIG. 9 and the subroutine marked as step ST85 in FIG. 12.

In step ST111 of FIG. 14, the following processing steps (1) and (2) are executed, and the program proceeds to step ST112.
 (1) The center position P or current location (refer to FIG. 4) which has moved is calculated based on the user's input.

(2) A map image is produced based on the moved center position P.

In step ST112, the program determines whether the unit maps are sufficient or not. In particular, the program determines whether the map image cannot be produced by reason of the lack of unit maps occasioned by the movement of the center position as would affect the extent of the map image to be shown. The program proceeds to step ST113 if "YES" (Y), and proceeds to step ST116 if "NO" (N).

In step ST113, the unit map transmission request for transmission of unavailable but necessary unit map data is transmitted to the server 7. The program then proceeds to step ST114.

In step ST114, the program determines whether reception of the necessary unit map data has been completed. The program proceeds to step ST115 if "YES" (Y), and repeats step ST114 if "NO" (N).

In step ST115, a map image is produced again based on the received unit map data. The program then proceeds to step ST116.

In step ST116, the display image on the information display screen 11 is updated as the produced map image (map image after the scroll). The program then proceeds to step ST117.

In step ST117, the program determines whether an input has been made to scroll again. The program returns to step ST111 if "YES" (Y), and proceeds to step ST118 if "NO" (N).

In step ST118, the program determines whether an input has been made to finish the scroll display by means of the input key 12. If "NO" (N), the program returns to step ST117 and if "YES" (Y), completes the scroll selection processing shown in FIG. 14, and returns to step ST39 or ST85.

Function of First Embodiment

Under the route guidance system S of the first embodiment provided with the above configuration, a route RX is determined from the starting location X1 to the destination location X10 according to the route searching conditions transmitted from the mobile phone 1, and includes the starting location and the destination location during the route data transmission processing of the server 7 (refer to step ST2). Guide points X5 and X8 are then selected based on predetermined conditions (route turn angle $\alpha_i$ and the road type data) from among the guide point candidates X1 to X10 comprising the points of connection between the lines and curves of the route RX formed by connecting the multiple lines and curves successively in a guide point setting process (ST3 to ST11). The route data including the guide points X5 and X8 is then produced in the server 7, and transmitted to the mobile phone 1.

Then, the map data (lacking unit map data) corresponding to the map data transmission request (unit map transmission request) transmitted from the mobile phone 1 during the map data transmitting process, is transmitted from the server 7 to the mobile phone 1 in the map data transmitting process of the server, in parallel with the route data transmitting process including the guide point setting process.

Thereafter, the optimum map image which can be shown on the information display screen 11 is produced based on the map data composed of the data of received multiple unit maps in the map image producing process of the mobile phone 1 (refer to step (1) in step ST63, step ST111, and the like).

On the other hand, the route image is produced based on the route data received including data pertinent to the position of the guide points, and the possible range of display on the information display screen 11 of the mobile phone 1 in the route image producing process (refer to step (2) in step ST63) of the mobile phone 1. The route guidance map image is thus produced by combining the produced map image and the route image in the guide map image producing/showing step (2) in step ST63, and is shown on the information display screen 11.

Then, the guide point X5, or X8 or the destination X10 closest to the current location of the mobile phone 1 in the forward direction along the route RX is established as the guide execution point from among the guide points X5 and X8, and the destination location X10, in the guide execution point setting process (refer to step (1) in step ST67) of the mobile phone 1.

Thereafter, the user is notified of the guide information (the reproduction of the guide voice and/or the display of the notifying image) based on the distance Li between the current location and the guide execution point X5, X8 or X10 in the guide information notification process. In particular, the notification image display process takes place (refer to step ST68), by which the distance notifying image 22f, representing the distance between the current location and the guide execution point X5, X8, or X10 is displayed on the information display screen 11 as the guide information. By selecting reproduction of the voice guide, the guide voice message is then activated to notify the user of the guide information if the distance between the current location and the guide execution point has reached the predetermined distance (200 m, 100 m, 50 m, 30 m or less, or 20 m or less) in the voice guide reproduction process (refer to steps ST69 to ST80).

In the route guidance system S of the first embodiment, the route data including the data of the entire route and data pertinent to the position of the guide points is thus transmitted regardless of the transmission of map data. Accordingly, it is possible for the mobile phone 1 to recognize the locations of the guide points and the directions in which to turn at the guide points based on the route data, regardless of the map data received and stored by the mobile phone 1. In other words, the mobile phone 1 can recognize the locations of and the directions in which to turn at these guide points outside the scope of the received unit map data. Thus, in case of a long route extending over a large number of unit maps, while it was not possible for a mobile terminal of prior art to access routes and guide points existing in unit maps which have not been received, it is possible for the mobile phone according to the route guidance system S of the first embodiment, even without receiving necessary unit map data, to recognize guide points from the route data received, independently of unit map data.

In addition, since the route data transmitted from the server 7 and the route data stored in the mobile phone 1 is relatively small in quantity compared with the volume of transmitted/received entire route data and map data combined to form the route guidance map image, the quantity of transmitted and received data may be reduced. And, since the quantity of data to be received and/or transmitted is not so large, a storage device with a relatively small storage capacity may be employed, thereby preventing an increase in the cost of the mobile phone 1.

Further, under the route guidance system S of the first embodiment, a guide point as well as the direction in which to turn is determined according to the route turn angle $\alpha_i$, which information can be transmitted to the mobile phone 1.

Further, under the route guidance system S of the first embodiment, since the guide voice and the distance notifying image 22f are used to notify the user of the distance to a guide execution point and the direction in which to turn, it is possible to prevent the user from erroneously passing a guide point such as a corner. Especially, since the voice guide can be used for notification of guide information, the user can recognize the direction in which to turn and the distance to a guide execution point even without looking at the information display screen 11 of the mobile phone 1.

Further still, under the route guidance system S of the first embodiment, since the unit map data is transmitted as vector data from the server 7 to the mobile phone 1, and the mobile phone 1 produces the map image, it is possible to prevent characters and the like located on the map from expanding, contacting or tilting during display on the information display screen 11 when the map is scaled up or down or rotated.

Although the embodiment of the present invention has been specified in the preceding paragraphs, the invention is not limited thereto and may be modified in various ways within the gist of the present invention as described in the claims.

For example, although a guide point is established based on the route turn angle αi as disclosed in the first embodiment, alternatively, a guide candidate point may be set as a guide point if the direction of the road on the starting location side of the guide candidate point (stored in advance) is different from the direction of the road on the destination location side (stored in advance) in terms of two-direction intervals or more in sixteen directions.

Likewise, although the user is notified of the distance to a guide point and the direction in which to turn by means of the guide voice and the information display as disclosed in the first embodiment, instructions may be given to cause the mobile phone 1 to vibrate or reproduce a sound effect or music at a predetermined distance for the purpose of notification, for example.

Moreover, the present invention is not limited to the mobile phone 1, and may be applied to a mobile terminal such as a PDA.

Further, although vector map data is used as disclosed in the first embodiment, it is possible to provide a configuration where a raster map image (bit map image) which can be displayed on the mobile phone 1 may be produced and transmitted by the server 7.

Further, even though the guide point candidates X1 to X10 are established based on the connection pints NA1 to NC7 set in advance according to the first embodiment, after the route RX has been established, guide point candidates Xi may be set along the route at intervals of 10 m, and guide points may thereafter be determined based on the turn angle αi or the like.

Further, under the present invention the user is not only notified of guide information by means of the guide voice and the distance display corresponding to the location of the established guide point based on data pertinent to the position of the guide point, as disclosed in the first embodiment. Based on the distance between the current location and the guide point, the mobile terminal according to the invention is capable of anticipating whether any unit map image is required and request for transmission thereof in advance, for example.

Further, even though a guide point may be reset based on a change in the type of road according to the first embodiment, it is also possible to set end points for pedestrian bridges, pedestrian crossings, long staircases, and the like, which are registered in the map data in advance, as guide points.

What is claimed is:

1. A route guidance system comprising a mobile terminal including (A1) through (A14) and a server including (B1) through (B9):

(A1) searching condition input means composed of a searching condition entry image display means that displays an image used to enter route searching condition data consisting of a starting location and a destination location on an information display screen, and a searching condition storing means for storing the route searching condition data established as a result of the input made to the route searching condition entry image;

(A2) searching condition transmitting means that transmits the route searching condition data to the server;

(A3) searching result receiving means that receives route data representing a route, from the starting location on one end to the destination location on the other end formed by connecting a plurality of lines and curves in succession, from the server, and which is produced by the server according to the route searching condition data, and;

(A4) map request transmitting means that transmits map data transmission requests for the transmission of map data to the server;

(A5) map data receiving means that receives map data transmitted from the server;

(A6) route image producing means that produces a route image based on route data and the possible range of display on the information display;

(A7) guide map image producing means that produces a route guidance map image by combining the route image and the map image obtained based on the map data;

(A8) current location measuring means that measures the current location of the mobile terminal;

(A9) guide execution point setting means that establishes the guide point situated along the route nearest the current location or the destination location as a guide execution point;

(A10) distance calculating means that calculates the distance between the current location and the guide execution point based on data pertinent to the position of the current location and the position of the guide execution point;

(A11) guide information notifying means that notifies the user of the guide information based on the distance between the current location and the guide execution point;

(A12) guide voice storing means that stores a guide voice for notifying the user that the distance between the current location and the guide execution point has reached a predetermined distance;

(A13) distance notification discriminating means for determining whether the distance between the current location and the guide execution point has reached a predetermined distance; and (A14) the guide information notifying means comprising guide voice reproducing means that reproduces the guide voice as guide information if the predetermined distance has been reached, and (B1) searching condition receiving means that receives the data of route searching conditions transmitted from the mobile terminal;

(B2) route producing means that determines the route from the starting location to the destination location according to the route searching condition received, and produces the route data consisting of starting location data which indicates the position of the starting location, destination location data which indicates the position of the destination location, and position data pertaining to a guide point which is set in the course of the route, and notifies the user of guide information;

(B3) route data transmitting means that transmits the route data to the mobile terminal;

(B4) map data storing means that stores map data and road data that is formed by connecting a plurality of lines and curves in succession along the center of a road on a map, and comprises data pertinent to the location of the point of connection between the lines and curves;

(B5) map request receiving means that receives the map data transmission request transmitted from the mobile terminal;

(B6) map information transmitting means that transmits the map data corresponding to the map data transmission request to the mobile terminal;

(B7) a guide point candidate setting means that sets guide point candidates comprising the points of connection between the lines and curves forming the route;

(B8) a route turn angle determining means that determines for a specific guide point candidate whether the route turn angle formed along the route between the starting location guide point candidate situated on the starting location side of the specific guide point candidate and the specific guide point candidate, and whether the route turn angle formed along the route between the destination location guide point candidate situated on the destination location side of the specific guide point candidate and the specific guide point candidate, is equal to or less than a predetermined angle; and (B9) a guide point setting means that sets the guide point from among the guide point candidates in accordance with a predetermined condition, and sets the specific guide point candidate as the guide point if the route turn angle is equal to or less than the predetermined angle.

2. A server comprising:

searching condition receiving means that receives the data of route searching conditions including a starting location and a destination location transmitted from a mobile terminal;

route producing means that determines a route from the starting location on one end to the destination location on the other end formed by connecting a plurality of lines and curves in succession according to the route searching condition received, and produces the route data consisting of starting location data which indicates the position of the starting location, destination location data which indicates the position of the destination location, and position data pertaining to a guide point which is set in the course of the route, and notifies the user of guide information;

route data transmitting means that transmits the route data to the mobile terminal;

map data storing means that stores map data and road data that is formed by connecting a plurality of lines and curves in succession along the center of a road on a map, and comprises data pertinent to the location of the points of connection between the lines and curves;

map request receiving means that receives the map data transmission request transmitted from the mobile terminal, and requests a transmission of the map data to the mobile terminal; and map information transmitting means that transmits the map data corresponding to the map data transmission request to the mobile terminal;

a guide point candidate setting means that sets guide point candidates comprising the points of connection between the lines and curves forming the route;

a route turn angle determining means that determines for a specific guide point candidate whether the route turn angle formed along the route between the starting location guide point candidate situated on the starting location side of the specific guide point candidate and the specific guide point candidate, and whether the route turn angle formed along the route between the destination location guide point candidate situated on the destination location side of the specific guide point candidate and the specific guide point candidate, is equal to or less than a predetermined angle; and a guide point setting means that sets the guide point from among the guide point candidates in accordance with a predetermined condition, and sets the specific guide point candidate as the guide point if the route turn angle is equal to or less than the predetermined angle.

3. A computer-readable recording medium that records a program for causing a computer constituting a server designed to execute functions, comprising:

searching condition receiving means that receives the data of route searching conditions including a starting location and a destination location transmitted from a mobile terminal;

route producing means that determines a route from the starting location on one end to the destination location on the other end formed by connecting a plurality of lines and curves in succession according to the route searching condition received, and produces the route data consisting of starting location data which indicates the position of the starting location, destination location data which indicates the position of the destination location, and position data pertaining to a guide point which is set in the course of the route, and notifies the user of guide information;

route data transmitting means that transmits the route data to the mobile terminal;

map data storing means that stores map data and road data that is formed by connecting a plurality of lines and curves in succession along the center of a road on a map, and comprises data pertinent to the location of the points of connection between the lines and curves;

map request receiving means that receives the map data transmission request transmitted from the mobile terminal, and requests a transmission of the map data to the mobile terminal;

map information transmitting means that transmits map data corresponding to the map data transmission request to the mobile terminal;

a guide point candidate setting means that sets guide point candidates comprising the points of connection between the lines and curves forming the route;

a route turn angle determining means that determines for a specific guide point candidate whether the route turn angle formed along the route between the starting location guide point candidate situated on the starting location side of the specific guide point candidate and the specific guide point candidate, and whether the route turn angle formed along the route between the destination location guide point candidate situated on the destination location side of the specific guide point candidate and the specific guide point candidate, is equal to or less than a predetermined angle; and a guide point setting means that sets the guide point from among the guide point candidates in accordance with a predetermined condition, and sets the specific guide point candidate as the guide point if the route turn angle is equal to or less than the predetermined angle.

* * * * *